(12) United States Patent
Blum et al.

(10) Patent No.: US 10,241,351 B2
(45) Date of Patent: Mar. 26, 2019

(54) EYEWEAR WITH MAGNETIC TRACK FOR ELECTRONIC WEARABLE DEVICE

(71) Applicant: POGOTEC, INC., Roanoke, VA (US)

(72) Inventors: Ronald D. Blum, Roanoke, VA (US); William Kokonaski, Gig Harbor, WA (US); Richard Clompus, Trinidad, CA (US); Walter Dannhardt, Roanoke, VA (US); Massimo Pinazza, Domegge di Cadore (IT); Claudio Dalla Longa, Valdobbiadene (IT); Anita Trajkovska-Broach, Christiansburg, VA (US)

(73) Assignee: PogoTec, Inc., Roanoke, VA (US)

( * ) Notice: Subject to any disclaimer, the term of this patent is extended or adjusted under 35 U.S.C. 154(b) by 0 days.

(21) Appl. No.: 15/179,018

(22) Filed: Jun. 10, 2016

(65) Prior Publication Data

US 2016/0363787 A1 Dec. 15, 2016

Related U.S. Application Data

(60) Provisional application No. 62/173,741, filed on Jun. 10, 2015, provisional application No. 62/180,199,
(Continued)

(51) Int. Cl.
*G02C 1/00* (2006.01)
*G02C 11/00* (2006.01)
(Continued)

(52) U.S. Cl.
CPC ............. *G02C 11/10* (2013.01); *G02C 5/008* (2013.01); *G02C 5/14* (2013.01); *G02C 5/146* (2013.01); *G02C 5/22* (2013.01); *G02C 2200/02* (2013.01)

(58) Field of Classification Search
CPC G02C 2200/08; G02C 2200/02; G02C 5/143; G02C 5/22; G02C 9/00; G02C 11/10
(Continued)

(56) References Cited

U.S. PATENT DOCUMENTS 3,476,467 A 11/1969 Curry
3,593,449 A 7/1971 Nielson
(Continued)

FOREIGN PATENT DOCUMENTS

CA 154079 S 12/2014
CN 1117593 A 2/1996
(Continued)

OTHER PUBLICATIONS

International Search Report and Written Opinion received for PCT/US16/36940 dated Sep. 8, 2016; pp. all.
(Continued)

*Primary Examiner* — Hung Dang
(74) *Attorney, Agent, or Firm* — Dorsey & Whitney LLP

(57) ABSTRACT

An eyewear system according to the present disclosure may include at least one temple, and a temple guide provided on the at least one temple, wherein the temple guide comprises a guide surface defined by a ferromagnetic material of the temple, and wherein the temple guide is configured to magnetically retain an electronic wearable device in slidable attachment therewith and to restrict lateral movement of the electronic wearable device relative to the temple when the electronic wearable device is engaged with the temple guide.

37 Claims, 20 Drawing Sheets

Related U.S. Application Data filed on Jun. 16, 2015, provisional application No. 62/186,341, filed on Jun. 29, 2015, provisional application No. 62/246,803, filed on Oct. 27, 2015, provisional application No. 62/249,839, filed on Nov. 2, 2015, provisional application No. 62/253,813, filed on Nov. 11, 2015, provisional application No. 62/289,488, filed on Feb. 1, 2016, provisional application No. 62/306,331, filed on Mar. 10, 2016.

(51) Int. Cl.
   *G02C 5/00* (2006.01)
   *G02C 5/14* (2006.01)
   *G02C 5/22* (2006.01)

(58) Field of Classification Search
   USPC .............. 351/158, 111, 121, 51, 52; 348/42
   See application file for complete search history.

(56) References Cited

U.S. PATENT DOCUMENTS

| | | |
|---|---|---|
| 3,780,918 A | 12/1973 | Curtis |
| 4,351,086 A | 9/1982 | Drlik |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,791,963 A | 12/1988 | Gronert et al. |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,913,815 A | 6/1999 | Ball et al. |
| 5,915,588 A | 6/1999 | Stoken et al. |
| 6,017,119 A | 1/2000 | Huang |
| 6,020,920 A | 2/2000 | Anderson |
| 6,028,413 A | 2/2000 | Brockmann |
| 6,036,309 A | 3/2000 | Liu et al. |
| 6,076,927 A | 6/2000 | Owens |
| 6,091,546 A | 7/2000 | Spitzer |
| 6,120,146 A | 9/2000 | Harris |
| 6,157,291 A | 12/2000 | Kuenster et al. |
| 6,158,860 A | 12/2000 | Huang |
| 6,215,460 B1 | 4/2001 | Mizoguchi et al. |
| 6,275,681 B1 | 8/2001 | Vega et al. |
| 6,282,302 B1 | 8/2001 | Hara |
| 6,467,902 B2 | 10/2002 | Wang-lee |
| 6,474,813 B1 | 11/2002 | Yeh |
| 6,543,896 B1 | 4/2003 | Huang |
| D477,011 S | 7/2003 | Jamin |
| 6,657,673 B2 | 12/2003 | Ishikawa et al. |
| 6,711,744 B1 | 3/2004 | Hockenbury |
| 6,735,897 B1 | 5/2004 | Schmitter |
| 6,783,238 B1 | 8/2004 | Stepper |
| 6,977,479 B2 | 12/2005 | Hsu |
| 7,003,353 B1 | 2/2006 | Parkhouse |
| 7,043,041 B2 | 5/2006 | Švajda et al. |
| 7,092,763 B1 | 8/2006 | Griffith et al. |
| 7,126,558 B1 | 10/2006 | Dempski |
| D531,656 S | 11/2006 | Della Valle |
| 7,158,096 B1 | 1/2007 | Spitzer |
| 7,172,283 B1 | 2/2007 | Asta |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| D637,644 S | 5/2011 | Gonzalez |
| 7,937,880 B1 | 5/2011 | Fidlow |
| 7,979,963 B2 | 7/2011 | Lee-Holowka et al. |
| 7,988,283 B2 | 8/2011 | Jannard |
| 8,011,783 B1 * | 9/2011 | Leblang ............ G02C 11/06 351/158 |
| 8,046,948 B2 | 11/2011 | Mauch et al. |
| 8,068,169 B2 | 11/2011 | Chang |
| D650,411 S | 12/2011 | Fuchs |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| D671,590 S | 11/2012 | Klinar et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| D711,962 S | 8/2014 | Thixton |
| D712,452 S | 9/2014 | Fuchs |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,922,161 B2 | 12/2014 | Choi et al. |
| D720,800 S | 1/2015 | Shin |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,953,827 B2 | 2/2015 | Sacha et al. |
| 8,957,629 B2 | 2/2015 | Ryu et al. |
| D724,134 S | 3/2015 | Wu |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |

(56) References Cited

U.S. PATENT DOCUMENTS

| | | |
|---|---|---|
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |
| D737,889 S | 9/2015 | Yoo |
| 9,122,083 B2 | 9/2015 | Blum |
| D741,943 S | 10/2015 | Keplinger |
| 9,152,130 B2 | 10/2015 | Pattikonda et al. |
| D742,372 S | 11/2015 | Christopher et al. |
| D743,477 S | 11/2015 | Strecker |
| D743,479 S | 11/2015 | Keplinger |
| D745,922 S | 12/2015 | Shen |
| D746,358 S | 12/2015 | Markovitz et al. |
| D755,787 S | 5/2016 | Zander et al. |
| 9,344,816 B2 | 5/2016 | Larsen et al. |
| 9,380,374 B2 | 6/2016 | Sprague et al. |
| D763,951 S | 8/2016 | Chae |
| D765,765 S | 9/2016 | Clegg |
| D766,770 S | 9/2016 | Devaney et al. |
| D767,013 S | 9/2016 | Hsu |
| D767,014 S | 9/2016 | Fuchs |
| 9,461,501 B2 | 10/2016 | Partovi et al. |
| D772,330 S | 11/2016 | Hsu |
| D781,952 S | 3/2017 | Fuchs |
| 9,628,707 B2 | 4/2017 | Blum et al. |
| 9,635,222 B2 | 4/2017 | Blum et al. |
| D787,582 S | 5/2017 | Desodt et al. |
| 9,823,494 B2 | 11/2017 | Blum et al. |
| 9,930,257 B2 | 3/2018 | Blum et al. |
| D820,348 S | 6/2018 | Serlenga |
| D823,931 S | 7/2018 | Shin |
| 2001/0026684 A1 | 10/2001 | Sorek et al. |
| 2001/0041073 A1 | 11/2001 | Sorek et al. |
| 2002/0170147 A1 | 11/2002 | Heller |
| 2003/0044180 A1 | 3/2003 | Lindberg |
| 2004/0033058 A1 | 2/2004 | Reich |
| 2004/0080299 A1 | 4/2004 | Forster et al. |
| 2004/0088051 A1 | 5/2004 | Seligman |
| 2004/0221370 A1 | 11/2004 | Hannula et al. |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0167558 A1 | 8/2005 | Smith |
| 2005/0248717 A1 | 11/2005 | Howell et al. |
| 2006/0004546 A1 | 1/2006 | Slanec |
| 2006/0023158 A1 | 2/2006 | Howell et al. |
| 2006/0034478 A1 | 2/2006 | Davenport |
| 2006/0055786 A1 | 3/2006 | Ollila |
| 2006/0082730 A1 | 4/2006 | Franks |
| 2006/0095128 A1 | 5/2006 | Blum et al. |
| 2006/0121639 A1 | 6/2006 | Tai et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0153639 A1 | 7/2007 | Lafever et al. |
| 2008/0034637 A1 | 2/2008 | Summers |
| 2008/0088791 A1 | 4/2008 | Smith |
| 2008/0116847 A1 | 5/2008 | Loke et al. |
| 2008/0137890 A1 | 6/2008 | Petersen et al. |
| 2008/0130537 A1 | 7/2008 | Weinberg et al. |
| 2008/0163536 A1 | 7/2008 | Koch et al. |
| 2008/0183028 A1 | 7/2008 | Guillen et al. |
| 2008/0192114 A1 | 8/2008 | Pearson et al. |
| 2008/0208335 A1 | 8/2008 | Blum et al. |
| 2008/0231721 A1 | 9/2008 | Chou et al. |
| 2008/0239232 A1 | 10/2008 | Guerrero |
| 2008/0259269 A1 | 10/2008 | Grogan et al. |
| 2008/0301846 A1 | 12/2008 | Brillouet |
| 2009/0009410 A1 | 1/2009 | Dolgin et al. |
| 2009/0040308 A1 | 2/2009 | Temovskiy |
| 2009/0110386 A1 | 4/2009 | Kamada et al. |
| 2009/0173760 A1 | 7/2009 | Good |
| 2009/0189981 A1 | 7/2009 | Siann et al. |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0262205 A1 | 10/2009 | Smith |
| 2009/0264966 A1 | 10/2009 | Blum et al. |
| 2009/0273755 A1* | 11/2009 | Laventure ............ B43K 23/001 351/158 |
| 2009/0307828 A1 | 12/2009 | Ludlow |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0073478 A1 | 3/2010 | Kalous |
| 2010/0077334 A1 | 3/2010 | Yang et al. |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0245585 A1 | 9/2010 | Fisher et al. |
| 2010/0245757 A1 | 9/2010 | Sugihara et al. |
| 2010/0265655 A1 | 10/2010 | Metzler et al. |
| 2010/0284683 A1 | 11/2010 | Fressola et al. |
| 2010/0287683 A1 | 11/2010 | Neal |
| 2010/0315586 A1 | 12/2010 | Mansuy |
| 2010/0319096 A1 | 12/2010 | Scott et al. |
| 2011/0074349 A1 | 3/2011 | Ghovanloo |
| 2011/0115429 A1 | 5/2011 | Toivola et al. |
| 2011/0121042 A1 | 5/2011 | Weiss |
| 2011/0156639 A1 | 6/2011 | Ryu et al. |
| 2011/0181238 A1 | 7/2011 | Soar |
| 2011/0184320 A1 | 7/2011 | Shipps et al. |
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2012/0032631 A1 | 2/2012 | Bourilkov et al. |
| 2012/0062173 A1 | 3/2012 | Choi et al. |
| 2012/0075571 A1 | 3/2012 | Silver |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0130252 A1 | 5/2012 | Pohjanen et al. |
| 2012/0146575 A1 | 6/2012 | Armstrong et al. |
| 2012/0153903 A1 | 6/2012 | Kim et al. |
| 2012/0164943 A1 | 6/2012 | Bennett |
| 2012/0169272 A1 | 7/2012 | Khalepari |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0212593 A1 | 8/2012 | Na'Aman et al. |
| 2012/0280575 A1 | 11/2012 | Kim et al. |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0307229 A1 | 12/2012 | Conroy et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |

(56) References Cited

U.S. PATENT DOCUMENTS

| | | |
|---|---|---|
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chernokalov et al. |
| 2013/0062964 A1 | 3/2013 | Chernokalov et al. |
| 2013/0062965 A1 | 3/2013 | Chernokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0127410 A1 | 5/2013 | Park et al. |
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0182002 A1 | 7/2013 | Macciola et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235234 A1 | 9/2013 | Cucci et al. |
| 2013/0235332 A1 | 9/2013 | Blum et al. |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1* | 9/2013 | Belbey .............. G02C 7/02 351/158 |
| 2013/0252669 A1 | 9/2013 | Nhiayi |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0300204 A1 | 11/2013 | Partovi |
| 2013/0320736 A1 | 12/2013 | Teufel et al. |
| 2013/0329183 A1 | 12/2013 | Blum et al. |
| 2013/0343585 A1 | 12/2013 | Bennett et al. |
| 2014/0009627 A1 | 1/2014 | Tanaka et al. |
| 2014/0021796 A1 | 1/2014 | Song et al. |
| 2014/0022765 A1 | 1/2014 | Waters |
| 2014/0027521 A1 | 1/2014 | Pedicano et al. |
| 2014/0042824 A1 | 2/2014 | Fells et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0058506 A1 | 2/2014 | Tai et al. |
| 2014/0062395 A1 | 3/2014 | Kwon |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0153760 A1 | 6/2014 | Newton et al. |
| 2014/0159503 A1 | 6/2014 | Murakami et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0204235 A1 | 7/2014 | Wexler et al. |
| 2014/0223462 A1 | 8/2014 | Aimone et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268008 A1 | 9/2014 | Howell et al. |
| 2014/0268017 A1 | 9/2014 | Sweis et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0307902 A1 | 10/2014 | Ku et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0319927 A1 | 10/2014 | Cho et al. |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0035991 A1 | 2/2015 | Sachs et al. |

(56) References Cited

U.S. PATENT DOCUMENTS

| | | | |
|---|---|---|---|
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0086175 A1 | 3/2015 | Lorenzetti |
| 2015/0091389 A1 | 4/2015 | Byrne et al. |
| 2015/0102995 A1 | 4/2015 | Shen et al. |
| 2015/0103304 A1 | 4/2015 | Darcy |
| 2015/0137746 A1 | 5/2015 | Lee et al. |
| 2015/0158729 A1 | 6/2015 | Kobayashi |
| 2015/0168727 A1 | 6/2015 | Qaddoura |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0256021 A1 | 9/2015 | Kwon et al. |
| 2015/0261013 A1 | 9/2015 | Dobson et al. |
| 2016/0025996 A1 | 1/2016 | Bacon |
| 2016/0026156 A1 | 1/2016 | Jackson et al. |
| 2016/0033792 A1 | 2/2016 | Blum et al. |
| 2016/0037025 A1 | 2/2016 | Blum |
| 2016/0066656 A1 | 3/2016 | Ferris |
| 2016/0072296 A1 | 3/2016 | Nejatali et al. |
| 2016/0104284 A1 | 4/2016 | Maguire et al. |
| 2016/0125656 A1 | 5/2016 | James et al. |
| 2016/0154239 A9 | 6/2016 | Layson, Jr. |
| 2016/0172870 A1 | 6/2016 | Blum et al. |
| 2016/0174669 A1 | 6/2016 | Ferris |
| 2016/0182826 A1 | 6/2016 | Blum et al. |
| 2016/0190859 A1 | 6/2016 | Blum et al. |
| 2016/0203359 A1 | 7/2016 | von und zu Liechtenstein |
| 2016/0206056 A1 | 7/2016 | Pluemer et al. |
| 2016/0225191 A1 | 8/2016 | Mullins |
| 2016/0261147 A1 | 9/2016 | Blum et al. |
| 2016/0294225 A1 | 10/2016 | Blum et al. |
| 2016/0349533 A1 | 12/2016 | Grassi |
| 2017/0024612 A1 | 1/2017 | Wexler et al. |
| 2017/0069192 A1 | 3/2017 | Sood et al. |
| 2017/0127196 A1 | 5/2017 | Blum et al. |
| 2017/0134645 A1 | 5/2017 | Kim et al. |
| 2017/0150049 A1 | 5/2017 | Blum et al. |
| 2017/0195529 A1 | 7/2017 | Blum |
| 2017/0223236 A1 | 8/2017 | Oberlander et al. |
| 2017/0272640 A1 | 9/2017 | Fuller et al. |
| 2017/0329365 A1 | 11/2017 | Wong et al. |
| 2017/0363885 A1 | 12/2017 | Blum et al. |
| 2018/0042369 A1 | 2/2018 | Blum et al. |
| 2018/0063433 A1 | 3/2018 | Blum et al. |
| 2018/0088355 A1 | 3/2018 | Blum et al. |
| 2018/0116384 A1 | 5/2018 | Blum et al. |
| 2018/0129078 A1 | 5/2018 | Blum et al. |
| 2018/0131847 A1 | 5/2018 | Kokonaski et al. |
| 2018/0249078 A1 | 8/2018 | Blum et al. |
| 2018/0249079 A1 | 8/2018 | Blum et al. |
| 2018/0262055 A1 | 9/2018 | Schoenbart et al. |

FOREIGN PATENT DOCUMENTS

| | | |
|---|---|---|
| CN | 200972550 Y | 11/2007 |
| CN | 101529899 A | 9/2009 |
| CN | 201318005 | 9/2009 |
| CN | 202033546 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 4/2013 |
| CN | 203064344 U | 7/2013 |
| CN | 203178585 | 9/2013 |
| CN | 203708487 U | 7/2014 |
| CN | 104273891 A | 1/2015 |
| DE | 202009015991 | 4/2010 |
| EP | 0736268 | 10/1996 |
| ES | 2165795 | 3/2002 |
| GB | 2472120 A | 1/2011 |
| JP | 07099596 | 4/1995 |
| JP | H08505238 A | 6/1996 |
| JP | 2000138858 A | 5/2000 |
| JP | 2008067285 A | 3/2008 |
| JP | 3150547 U | 4/2009 |
| JP | 2012063641 A | 3/2012 |
| JP | 2017013087 A | 1/2017 |
| JP | 2017013088 A | 1/2017 |
| JP | 2017013089 A | 1/2017 |
| JP | 2017013090 A | 1/2017 |
| JP | 2017013091 A | 1/2017 |
| JP | 2017013092 A | 1/2017 |
| KR | 1020090047255 A | 5/2009 |
| KR | 1020140053341 A | 5/2014 |
| KR | 101421046 B1 | 7/2014 |
| KR | 20140091195 A | 7/2014 |
| KR | 1020140091195 A | 7/2014 |
| KR | 101646541 | 8/2016 |
| TW | M300818 U | 11/2006 |
| TW | 200843277 A | 11/2008 |
| TW | 201036430 A | 10/2010 |
| TW | M395176 U | 12/2010 |
| TW | 201145748 A1 | 12/2011 |
| TW | 201415753 A | 4/2014 |
| TW | 201520976 A | 6/2015 |
| TW | 201610506 A | 3/2016 |
| WO | 9208157 A1 | 5/1992 |
| WO | 0106298 A1 | 1/2001 |
| WO | 02/45044 A1 | 6/2002 |
| WO | 2009018391 A1 | 2/2009 |
| WO | 2009/052705 A1 | 4/2009 |
| WO | 2010137495 A1 | 12/2010 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | 2013/188343 A1 | 12/2013 |
| WO | 2014/012536 A1 | 1/2014 |
| WO | 2014012451 A1 | 1/2014 |
| WO | 2014045571 A1 | 3/2014 |
| WO | 2014/102536 A1 | 7/2014 |
| WO | 2014122538 A2 | 8/2014 |
| WO | 2014161083 A1 | 10/2014 |
| WO | 2015029215 A1 | 3/2015 |

(56) References Cited

FOREIGN PATENT DOCUMENTS

| WO | 2016022499 A1 | 2/2016 |
|---|---|---|
| WO | 2016141349 A1 | 9/2016 |
| WO | 2016205373 A1 | 12/2016 |
| WO | 20180031684 A1 | 2/2018 |
| WO | 2018075916 A1 | 4/2018 |
| WO | 2018089533 A1 | 5/2018 |
| WO | 2018165622 A1 | 9/2018 |

OTHER PUBLICATIONS

Design U.S. Appl. No. 29/556,571, entitled "Eyewear Temple", filed Mar. 1, 2016 (no copy provided in accordance with the 1287 O.G. 163 waiver published Oct. 19, 2004); pp. all.
U.S. Appl. No. 15/183,368, entitled "Wireless Power Systems and Methods Suitable for Charging Wearable Electronic Devices", filed Jun. 15, 2016 (no copy provided in accordance with the 1287 O.G. 163 waiver published Oct. 19, 2004); pp. all.
"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, pp. 1-16.
First Office Action received for TW Appl. No. 105118484 dated Jan. 13, 2017; pp. all.
Blum, Ronald D. et al., U.S. Appl. No. 15/337,796, entitled "Hearing Aid Adapted for Wireless Power Reception", filed Oct. 28, 2016, pp. all.
"Make Your Watch Smart!", http://www.ct-band.com/en/; captured Nov. 10, 2016, pp. all.
"Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILJBcOqYMmKeCs3g_rcvbST3HVWtuup_HzVQ3-lv5YFOBoCcK_w_wcB; captured Nov. 10, 2016, pp. all.
"Kairos T-Band Only", https://kairoswatches.com/tbands/tband/; captured Nov. 10, 2016, pp. all.
"Glance: World's First Smart Accessory for Your Watch", https://www.kickstarter.com/projects/1742184757/glance-worlds-first-smart-accessory-for-your-watch; captured Nov. 10, 2016, pp. all.
"Fitbit Pouch for Watch Strap", https://www.etsy.com/listing/186507712/fitbit-pouch-for-watch-strap; captured Nov. 10, 2016, pp. all.
"Classi: The World's First Leather Smart Strap for Classic Watches", http://www.maintool.me/classi.html; captured Nov. 10, 2016, pp. all.
"Marathon Watch Band Clip Compass", http://www.chronoworld.com/marathon-watch-band-clip-compass-co194004.html; captured Nov. 10, 2016, pp. all.
"Modillion Turns Any "Dumb" Watch Into a Smart Watch", http://newatlas.com/modillian-smartwatch-strap/32059/; captured Nov. 10, 2016, pp. all.
"Wearable Technology Meets the Art of Fine Watchmaking", http://www.montblanc.com/en-us/discover/specials/montblanc-introduces-e-strap.html; captured Nov. 10, 2016, pp. all.
"Multi Functional Pouch Armband Ankel Band Wristband for Fitbit Flex Fitbit One Clip . . . ", https://www.amazon.com/functional-armband-wristband-smartband-withings/dp/B00WALZXCW; captured Nov. 10, 2016, pp. all.

"Review of 1BANDID Sports & GPS Watch ID Bands", https://www.dcrainmaker.com/2011/09/review-of-1bandid-sports-gps-watch-id.html; captured Nov. 10, 2016, pp. all.
"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.
"Skyview Pinnacle", https://www.nicogerard.com/nico-gerard-skyview-pinnacle; captured Nov. 10, 2016, pp. all.
"Custom Watchband Holder for Fitbit Flex", http://www.shapeways.com/product/YWXHN5VYP/custom-watchband-holder-for-fitbit-flex?optionId=17995763; captured Nov. 10, 2016, pp. all.
""Unique" Hand-Made Strap Discretely Adds Smart Features to Any Watch", http://newatlas.com/unique-smartwatch-strap/39458/; captured Nov. 10, 2016, pp. all.
"Transform Your Wristwatch Into a Smart Device", http://www.wotch.de/; captured Nov. 10, 2016, pp. all.
First Office Action for ROC (Taiwan) Patent Appl. No. 104125151 dated Jul. 29, 2016, with English translation.
"Alpha—The World's Smallest 4K Action Camera", https://www.indiegogo.com/projects/alpha-the-world-s-smallest-4k-action-camera-sports; captured Oct. 9, 2017. pp. all.
U.S. Appl. No. 15/337,796, entitled "Hearing Aid Adapted for Wireless Power Reception", filed Oct. 28, 2016, pp. all.
U.S. Appl. No. 29/588,270, entitled "Eyewear Temple", filed Dec. 19, 2016, pp. all.
U.S. Appl. No. 15/789,574, entitled "Architecture for and Camera Devoid of Viewfinder", filed Oct. 20, 2017, pp. all.
U.S. Appl. No. 15/802,782 entitled "Wearable Camera System" filed Nov. 3, 2017, pp. all.
U.S. Appl. No. 15/807,308 entitled "A Smart Case for Electronic Wearable Device", filed Nov. 8, 2017, pp. all.
U.S. Appl. No. 15/842,112 entitled "Magnetic Attachment Mechanism for Electronic Wearable Device" filed Dec. 14, 2017, pp. all.
U.S. Appl. No. 15/843,639 entitled "Connectors for Attaching One or More Wearable Devices to Eyewear" filed Dec. 15, 2017, pp. all.
TASER International, Inc. "Taser Flex System User Manual", TASER International Inc., 2015, p. 1-21, 2015.
U.S. Appl. No. 15/627,759, filed Jun. 20, 2017 entitled "Image Alignment Systems and Methods", pp. all.
U.S. Appl. No. 15/672,971 entitled "Connectors for Attaching One or More Wearable Devices to Eyewear", filed Aug. 9, 2017, pp. all.
U.S. Appl. No. 15/863,474, entitled "Wearable Camera Systems and Apparatus and Method for Attaching Camera Systems or Other Electronic Devices to Wearable Articles", filed Jan. 5, 2018, pp. all.
"Inductive Limits in the Frequency Range 9 kHz to 148.5 kHz", ECC Report 135, Bordeaux, Sep. 2009, p. 1-16.
Smid, Peter : Chapter 1: Part Program Development, <URL: http://www.globalspec.com/reference/56201 /203279/chapter-1-part-program-development>, Published Dec. 29, 2011, pp. all.
U.S. Appl. No. 15/809,383 entitled "Wearable Camera Systems and Apparatus and Method for Attaching Camera Systems or Other Electronic Devices to Wearable Articles" filed Nov. 10, 2017, pp. all.
U.S. Appl. No. 15/917,413 entitled "Wireless Power Conversion System" filed Mar. 9, 2018, pp. all.

* cited by examiner

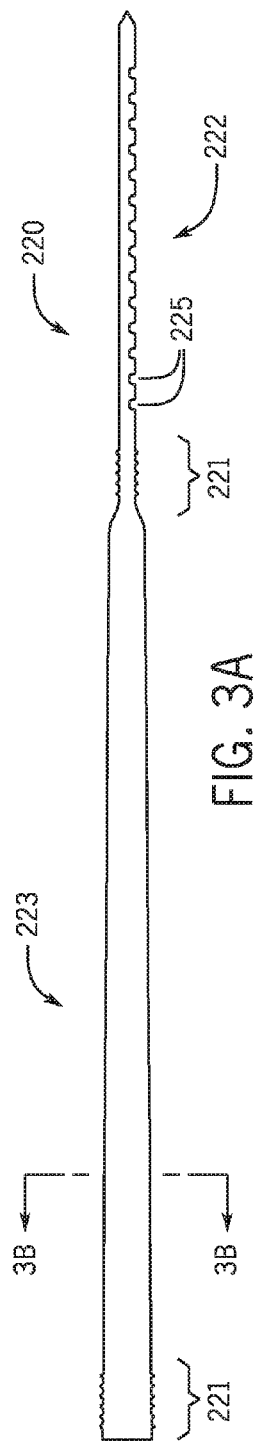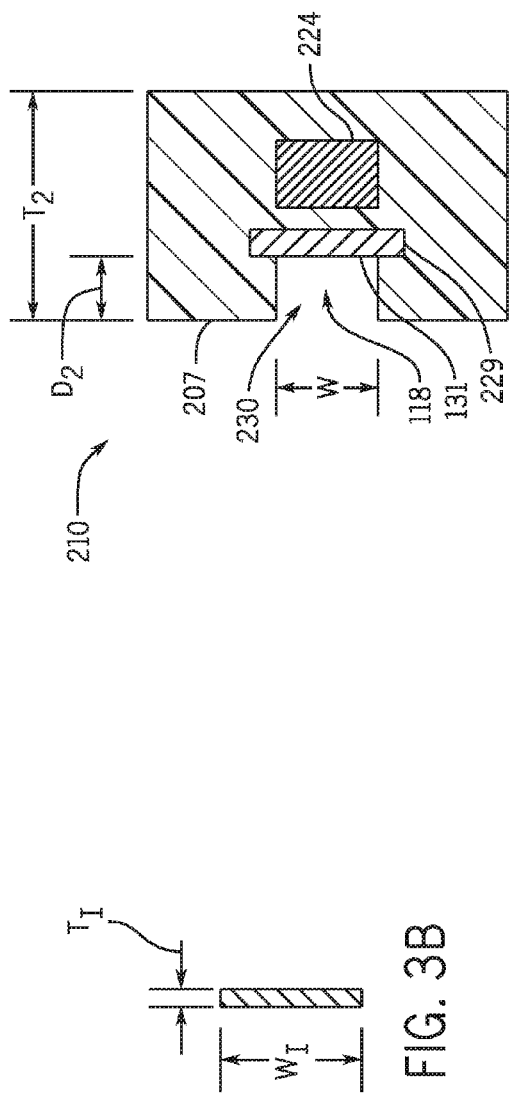

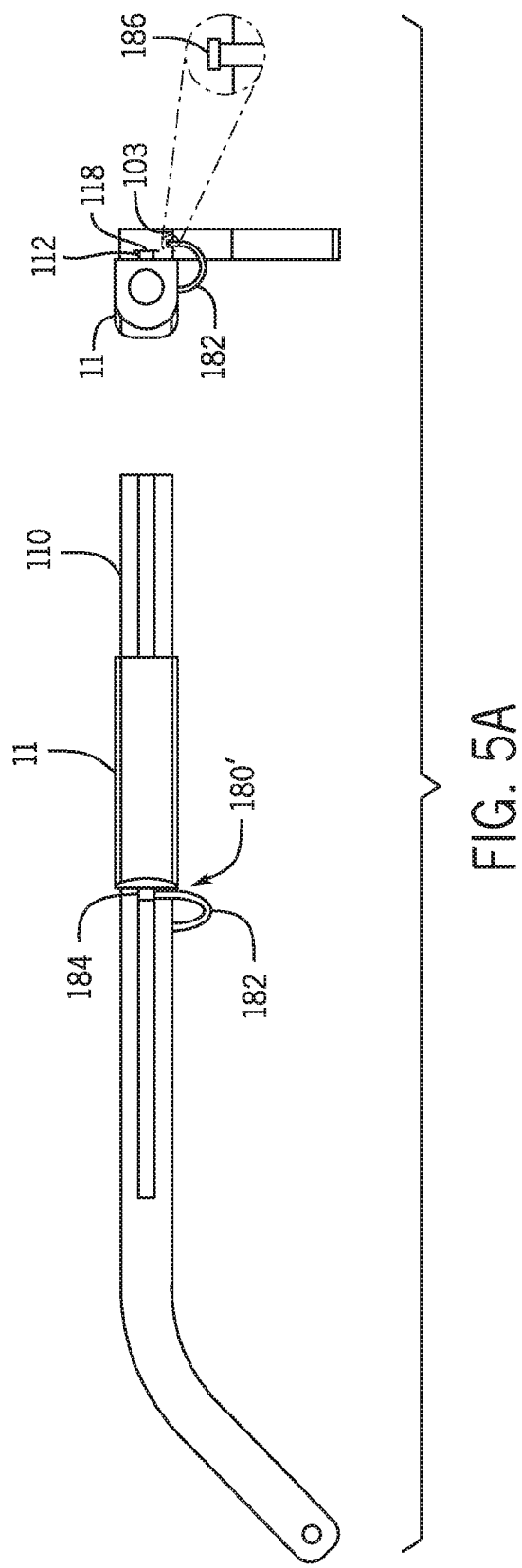

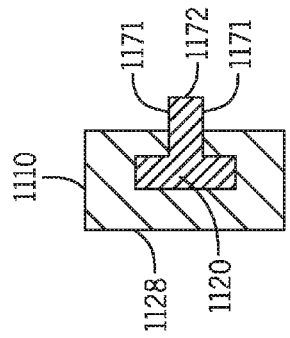
FIG. 12C
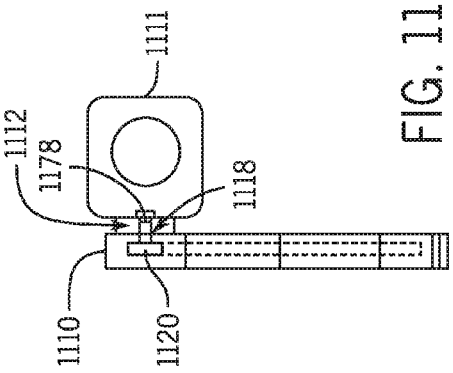
FIG. 11
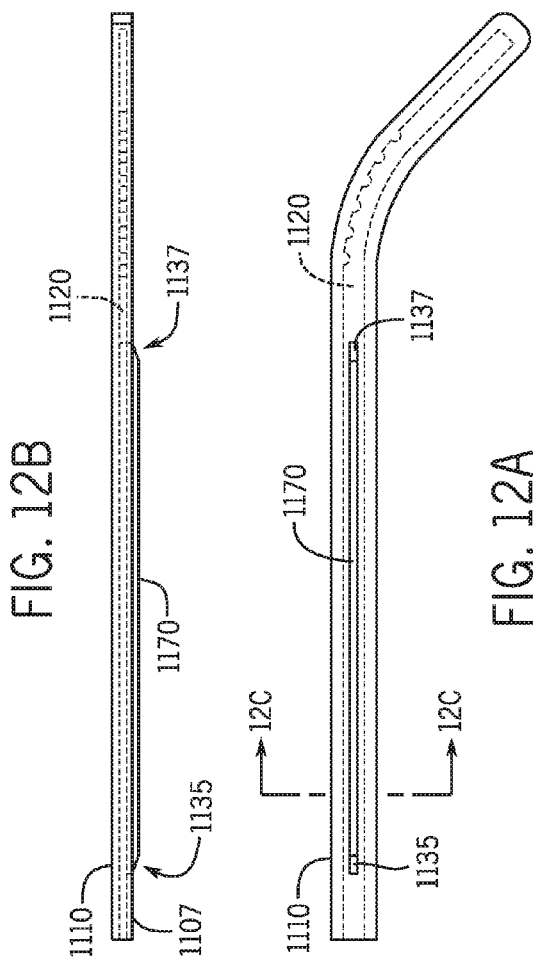
FIG. 12B
FIG. 12A
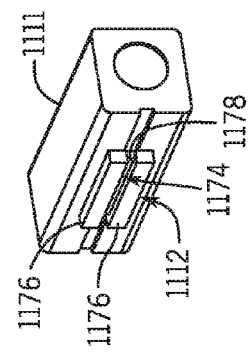
FIG. 13

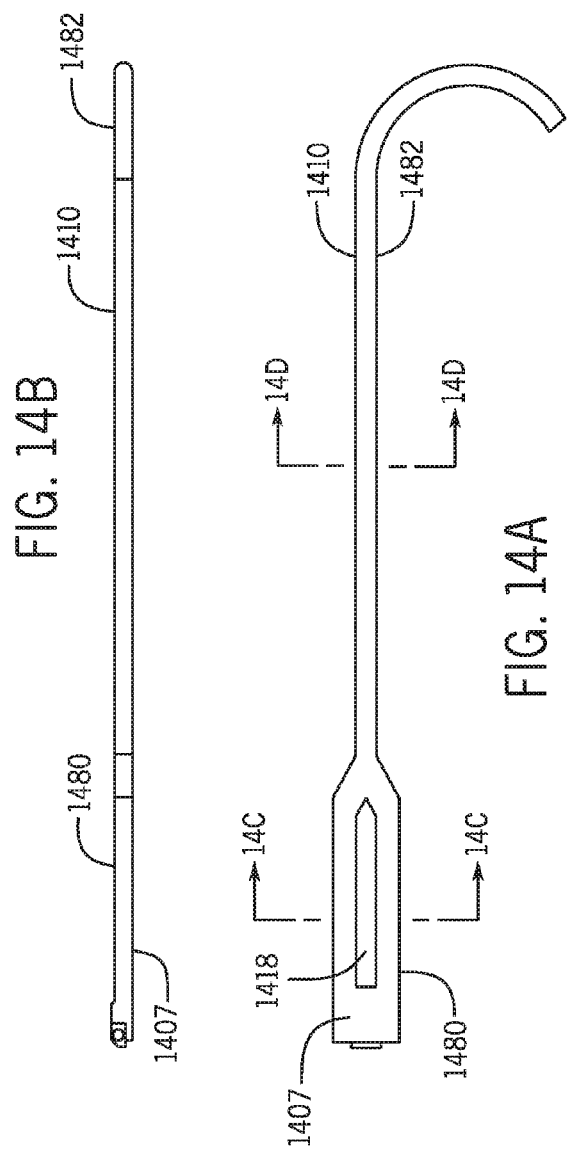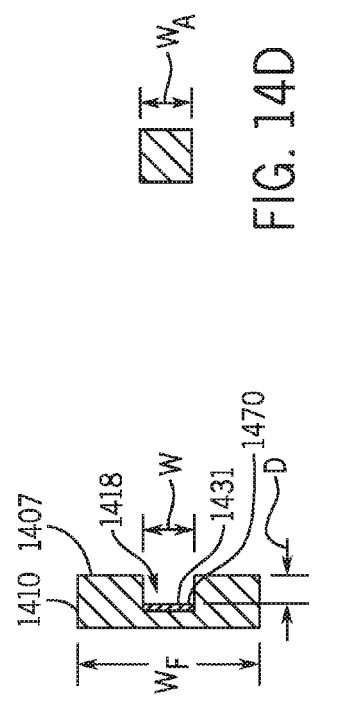

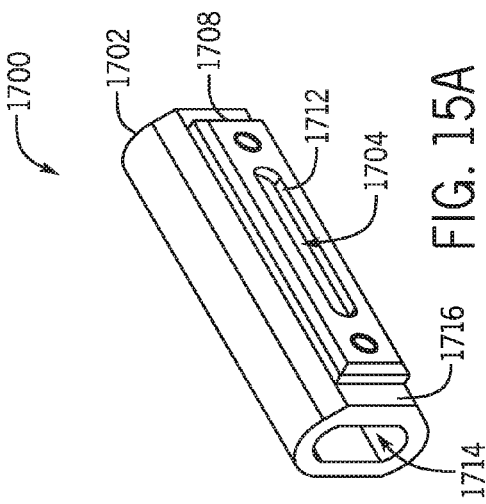
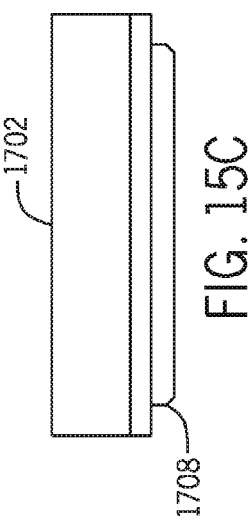
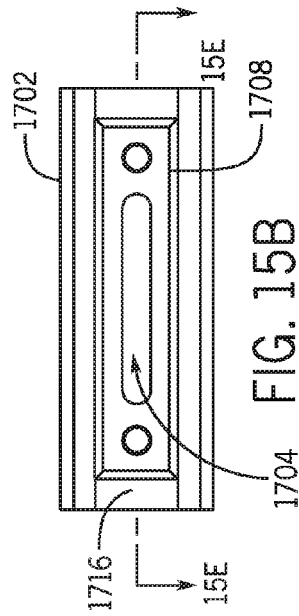
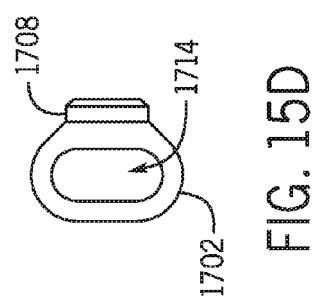
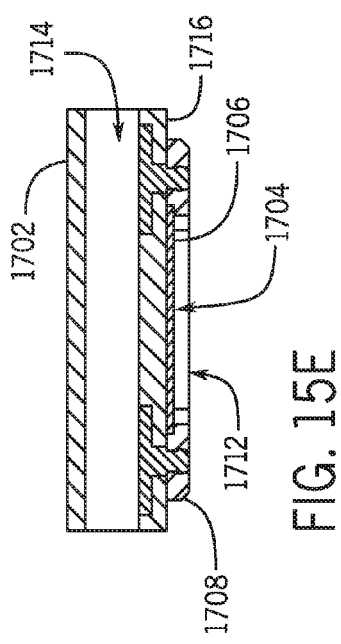
FIG. 15A
FIG. 15B
FIG. 15C
FIG. 15D
FIG. 15E

EYEWEAR WITH MAGNETIC TRACK FOR ELECTRONIC WEARABLE DEVICE

CROSS-REFERENCE TO RELATED APPLICATIONS

This application claims the benefit under 35 U.S.C. 119 of the earlier filing date of U.S. Provisional Application No. 62/173,741 entitled "ROBUST EYEWEAR TRACK, WIRELESS ENERGY TRANSFER SYSTEM AND ATTACHMENT MEANS FOR ELECTRONIC DEVICE", filed Jun. 10, 2015. The aforementioned provisional application is hereby incorporated by reference in its entirety, for any purpose.

This application claims the benefit under 35 U.S.C. 119 of the earlier filing date of U.S. Provisional Application No. 62/180,199 entitled "WIRELESS ENERGY TRANSFER CAMERA SYSTEM", filed Jun. 16, 2015. The aforementioned provisional application is hereby incorporated by reference in its entirety, for any purpose.

This application claims the benefit under 35 U.S.C. 119 of the earlier filing date of U.S. Provisional Application No. 62/186,341 entitled "WIRELESS ENERGY TRANSFER CAMERA SYSTEM", filed Jun. 29, 2015. The aforementioned provisional application is hereby incorporated by reference in its entirety, for any purpose.

This application claims the benefit under 35 U.S.C. 119 of the earlier filing date of U.S. Provisional Application No. 62/246,803 entitled "TEMPLE TRACK COMPRISING A MAGNET ATTRACTING MATERIAL", filed Oct. 27, 2015. The aforementioned provisional application is hereby incorporated by reference in its entirety, for any purpose.

This application claims the benefit under 35 U.S.C. 119 of the earlier filing date of U.S. Provisional Application No. 62/249,839 entitled "TEMPLE TRACK COMPRISING ELECTRONIC WEARABLE DEVICE AND A SAFETY CATCH", filed Nov. 2, 2015. The aforementioned provisional application is hereby incorporated by reference in its entirety, for any purpose.

This application claims the benefit under 35 U.S.C. 119 of the earlier filing date of U.S. Provisional Application No. 62/253,813 entitled "ENHANCED TEMPLE TRACK", filed Nov. 11, 2015. The aforementioned provisional application is hereby incorporated by reference in its entirety, for any purpose.

This application claims the benefit under 35 U.S.C. 119 of the earlier filing date of U.S. Provisional Application No. 62/289,488 entitled "INSTRUMENT AND METHOD TO MEASURE THE MAGNETIC ATTRACTION FOR EYEWEAR", filed Feb. 1, 2016. The aforementioned provisional application is hereby incorporated by reference in its entirety, for any purpose.

This application claims the benefit under 35 U.S.C. 119 of the earlier filing date of U.S. Provisional Application No. 62/306,331 entitled "EYEWEAR WITH ADVANCED TRACK", filed Mar. 10, 2016. The aforementioned provisional application is hereby incorporated by reference in its entirety, for any purpose.

TECHNICAL FIELD

The present disclosure relates to eyewear systems including eyewear with magnetic tracks for attachment of electronic wearable devices.

BACKGROUND

The number and types of commercially available electronic wearable devices continues to expand. Forecasters are predicting that the electronic wearable devices market will more than quadruple in the next ten years. Some hurdles to realizing this growth remain. Two major hurdles are the cosmetics/aesthetics of existing electronic wearable devices and their limited battery life. Consumers typically desire electronic wearable devices to be small, less noticeable, and require less frequent charging. The smaller the electronic wearable device, the more challenging it may be to removably attach the device to a wearable article, such as eyewear and further solutions in this area may thus be desirable.

SUMMARY

An eyewear system according to some examples herein may include a frame including a lens-retaining portion comprising first and second end portions, and a pair of temples, each connected to a respective one of the first and second end portions. Each of the temples may include a hinge portion and an insert extending from the hinge portion towards a distal end of the temple, wherein the insert is formed of a ferromagnetic material, and wherein at least one of the temples in the pair comprises a track extending longitudinally along a length of the temple, wherein a base of the track is defined by the insert and wherein walls of the track are defined by a second material disposed around the insert.

An eyewear system according another example of the present disclosure may include at least one temple, and a temple guide provided on the at least one temple, wherein the temple guide comprises a guide surface defined by a ferromagnetic material of the temple, and wherein the temple guide is configured to magnetically retain an electronic wearable device in slidable attachment therewith and to restrict lateral movement of the electronic wearable device relative to the temple when the electronic wearable device is engaged with the temple guide.

An eyewear system according to further examples herein may include an eyewear frame including at least one temple, a temple guide provided on the at least one temple, wherein the temple guide includes a guide surface defined by a ferromagnetic material of the temple, and an electronic wearable device configured to magnetically attach to the at least one temple via the temple guide, wherein the temple guide is configured to magnetically retain the electronic wearable device in slidable attachment therewith and to restrict lateral movement of the electronic wearable device relative to the temple when the electronic wearable device is engaged with the temple guide, and wherein the electronic wearable device includes a magnet which attaches to the ferromagnetic material, and an additional member for securing the electronic wearable device to the eyewear.

According to some examples herein, a wearable device adapter may include body of a stretchable material and configured to removably attach the adapter to an eyewear temple of any of a plurality of differently shaped eyewear frames, and a magnetic feature attached to the body and configured for magnetically retaining an electronic wearable device in attachment with the adapter.

BRIEF DESCRIPTION OF THE DRAWINGS

Features, aspects and attendant advantages of the present invention will become apparent from the following detailed description of various embodiments, including the best mode presently contemplated of practicing the invention, when taken in conjunction with the accompanying drawings, in which:

FIGS. 3A and 3B show a side and cross-sectional views of an insert in according to an embodiment of the present disclosure;

FIG. 4A shows a transverse cross-sectional view of a temple of an eyewear system according to another embodiment;

FIGS. 5A-5C shows eyewear systems according to further embodiments;

FIG. 11 shows a view of an eyewear system according to a further embodiment;

FIGS. 12A-12C show views of a temple of the eyewear in FIG. 11;

FIG. 13 shows a view of an exemplary electronic wearable device in the form of a camera which includes a device guide in accordance with some examples herein;

FIGS. 14A-14D show views of a thin eyewear temple with a temple guide according to another embodiment; and FIGS. 15A-15E show views of an adapter in accordance with an embodiment of the present disclosure.

DETAILED DESCRIPTION

The present application describes eyewear system which may include eyewear to which an electronic wearable device, such as a wearable camera, may be movably (e.g., slidably) attached. In some examples, the electronic wearable device may be removably attached to the eyewear. To that end, the eyewear may be provided with a guide for engagement with the electronic wearable device. The guide may be configured to restrict movement of the electronic wearable device in one or more directions. In some examples, the guide may steer the electronic device along a predetermined direction. The guide may be provided on the temple of the eyewear and may be referred to as temple guide. In some examples, the guide may be in the form of a magnetic track, which may be provided on a temple of the eyewear, and may also be referred to as temple track. The guide may be oriented along the length of the temple such that the electronic wearable device may be movable (e.g., slidable) between a forward position and an aft position along the length of the temple. The guide may be configured to restrict movement of the electronic wearable device in directions other than the direction defined between the forward and aft positions (e.g., longitudinal direction). The electronic wearable device may be removable from the guide for example by movement of the electronic wearable device in a direction substantially perpendicular to the longitudinal directions. The electronic wearable device, for example a camera, may include a device guide which is configured for cooperating fit with the guide on the eyewear (e.g., a temple guide). For examples, the device guide may be a male guide and the temple guide may be a female guide. In other examples, the device guide may be a female guide and the temple guide may be a male guide.

In some examples, the guide may be integral with the temple, e.g., not removable from the temple in the normal course of use of the eyewear. In other examples, the guide may be removably attached to the temple. For example, the guide may be incorporated into a guide adapter configured to engage the electronic wearable device. The guide adapter may be a universal adapter in that it may be configured for mounting to a variety of differently shaped pre-existing eyewear. In this manner, the guide adapter may enable pre-existing eyewear to be retrofitted for engagement with an electronic wearable device in accordance with the examples herein.

Figure 1:
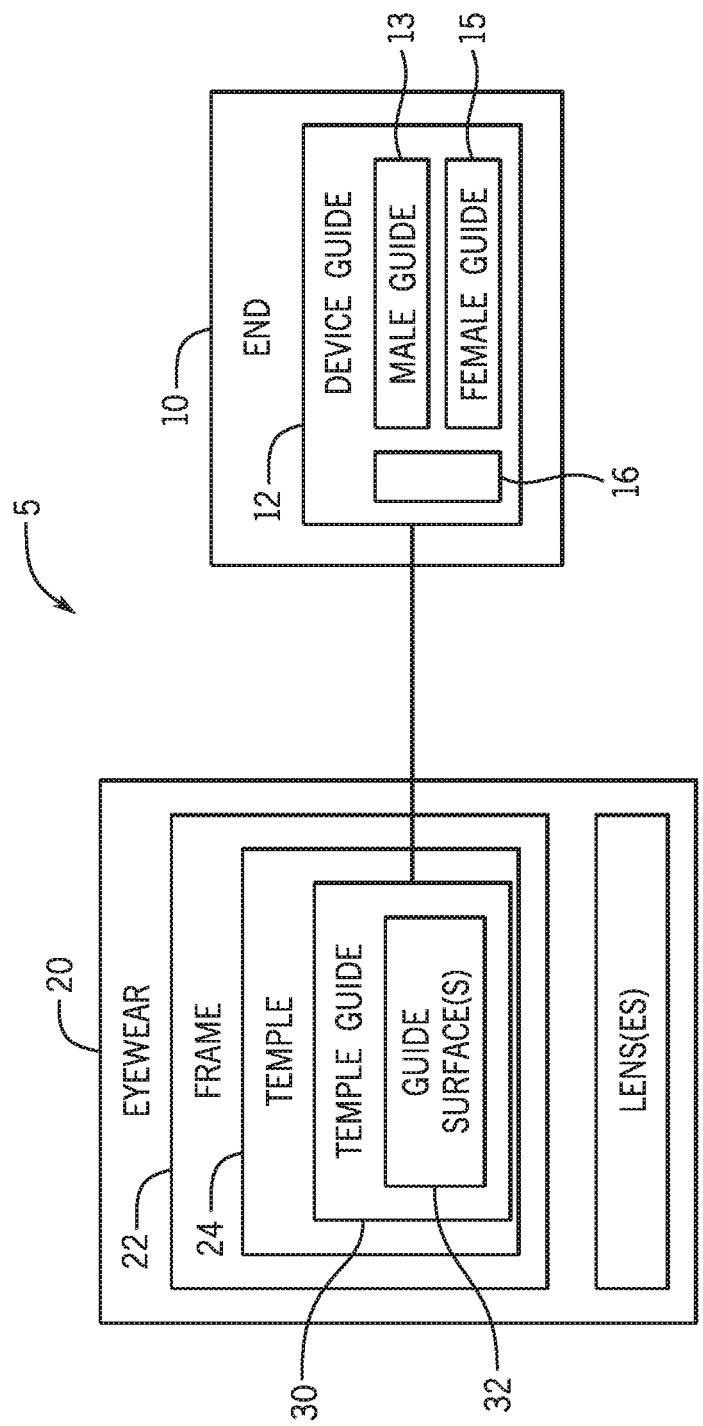
FIG. 1 shows a block diagram of an eyewear system in accordance with the present disclosure.

FIG. 1 shows a block diagram of an eyewear system 5, which includes eyewear 20 and an electronic wearable device 10 attached to the eyewear 20. An eyewear frame 22 of the eyewear 20 includes at least one temple 24. Typically, the eyewear frame 22 may include two temples, a left and a right temple configured for placement over a left and a right ear, respectively, of a user when the eyewear frame 22 is worn. The eyewear also typically includes at least one lens or a pair of lenses configured to be provided in the field of view of the user when the eyewear frame 22 is worn.

A guide 30 is provided on the temple 24, also referred to as temple guide, for engaging with a guide 12 (e.g., male guide 13, female guide 15) provided on the electronic wearable device 10, also referred to as device guide. The temple guide 30 and device guide 12 are configured to slidably engage such that the electronic wearable device may be retained in slidable attachment with the temple 24. The temple guide 30 may be configured to guide movement of the electronic wearable device 10 along a sliding direction. In accordance with the examples herein, the temple guide 30 and device guide 12 may be configured to attach magnetically. In some examples, the device guide 12 may include one or more magnets 16. In some examples, the one or more magnets 16 may include a neodymium-type magnet, a permanent magnet, or magnet(s) comprised of ferromagnetic material. The guide 30 may include a guide surface 32 which is configured for magnetic attraction with the device guide 12. In some examples, the guide surface 32 may be defined by a ferromagnetic material of the temple such that the guide 30 may magnetically retain the electronic wearable device 10.

The guides 30 and 12 may be configured such that relative lateral movement of the electronic wearable device 10 is restricted when the electronic wearable device 10 is engaged with the temple guide 30. That is, the guides 30 and 12 may be configured such that movement of the electronic wearable device 10 in one or more directions other than the sliding direction is constrained.

Figure 2A:
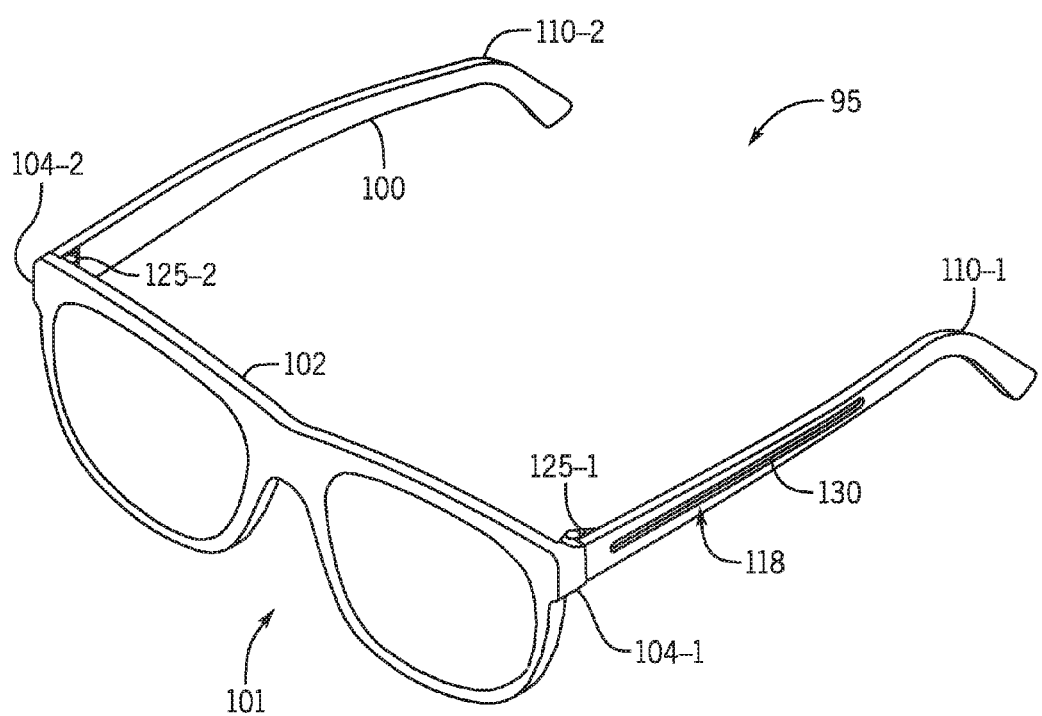
FIGS. 2A-2D show isometric, top, side, and transverse cross-sectional views of an eyewear system according to a first embodiment.
Figure 2B:
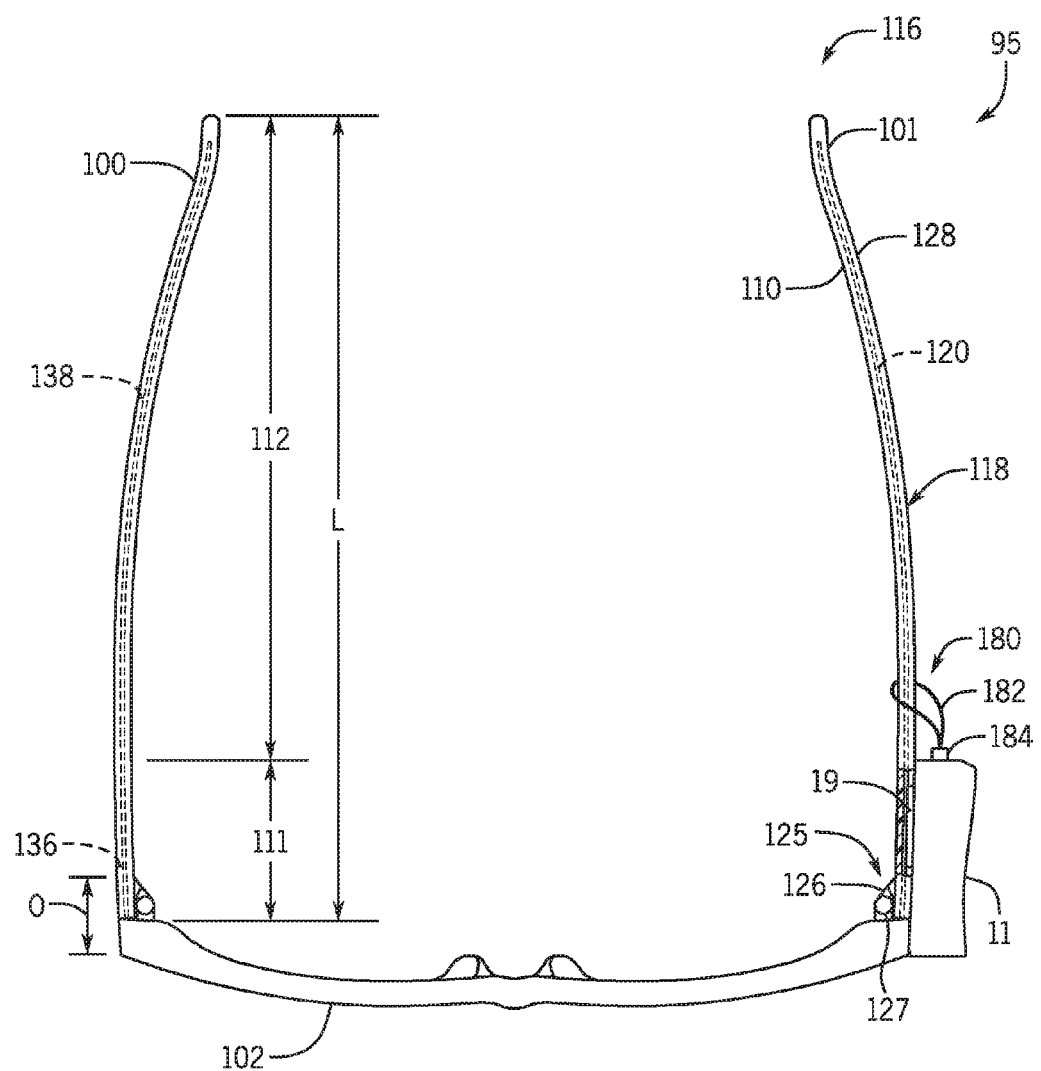

FIGS. 2A-2D show isometric, top or plan, side, and transverse cross-sectional views of components of an eyewear system according to a first embodiment. Components of the eyewear system 95 may be used to implement components of the eyewear system 5 in FIG. 1. For example, the electronic wearable device 10 of FIG. 1 may be a camera 11 as illustrated in FIG. 2B, although the present disclosure is not limited only to a camera for the electronic wearable device, as will be further described.

In the embodiment in FIGS. 2A-2D, the eyewear 100 includes a frame 101 configured to retain one or more lenses (e.g., prescription lenses, tinted lenses, shatter-resistant or ballistic lenses, combinations thereof or other types of lenses). The frame 101 includes a lens-retaining portion 102 which includes first and second end portions 104-1, 104-2 disposed at opposite ends of the lens-retaining portion 102. The frame 101 further includes a pair of temples 110 including first temple 110-1 (e.g., left temple) and second temple 110-2 (e.g., right temple). The first temple 110-1 is attached to the first end portion 104-1 and the second temple 110-2 is attached to the second end portion 104-2. The eyewear 100 may be provided in an unfolded configuration as illustrated in FIGS. 2A and 2B, e.g., as may be suitable when the eyewear 100 is worn. The temples 110-1, 110-2 are pivotally attached to the end portions 104-1, 104-2. In the illustrated example, each of the temples 110-1, 110-2 includes a hinge portion 125 (e.g., left and right hinge portions 125-1, 125-2, respectively), and the temples 110 are each attached to the lens-retaining portion 102 via their respective hinge portions 125-1, 125-2. In other examples, the temples 110 may be pivotally attached to the lens-retaining portion using any other type of flexure (e.g., a living hinge), which may enable the frame 101 to be provided in a folded configuration when not worn.

The eyewear 100 may include a guide 118 for attaching an electronic wearable device (e.g., camera 11) to the eyewear. The guide 118 may be configured to magnetically retain the electronic wearable device (e.g., camera 11) in attachment with the eyewear 100. In some examples, the electronic wearable device (e.g., camera) may be implemented in accordance with any of the examples in U.S. patent application Ser. No. 14/757,753 filed Dec. 23, 2015, and titled "Wireless Camera Systems and Methods", which application is incorporated by reference herein in its entirety for any purpose. The guide 118 may be configured to magnetically retain the electronic wearable device (e.g., camera 11) in attachment with the eyewear 100. The guide 118 may be configured to retain the electronic wearable device in slidable attachment with the eyewear 100. In other words, the electronic wearable device may be slidable or movable along a length of the guide while remaining in attachment with the eyewear 100. The guide 118 may be configured to restrict movement of the electronic wearable device in one or more directions with respect to the part of the frame to which the electronic wearable device is attached. The guide 118 may be integrally formed with the frame 101 or may be irremovably attached (e.g., welded, bolted, bonded, etc.) to the frame 101. In some examples, the guide may be removably attachable to the frame such as to enable removal of the guide from the frame during normal course of use. The guide 118 may be provided on the temple 110 and may thus be interchangeably referred to as temple guide 118. The temple guide 118 may be used to implement the temple guide 24-30 in FIG. 1. In some examples, a temple guide 118 may be provided on one or both of the temples 110-1, 110-2.

Figure 4B:
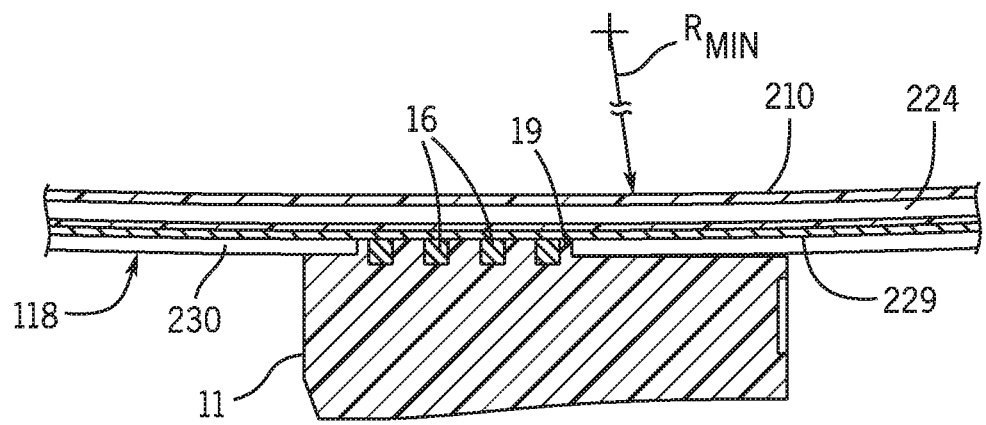
FIG. 4B shows a partial plan cross-sectional view of the temple in FIG. 4A and an electronic wearable device attached thereto.
Figure 4C:
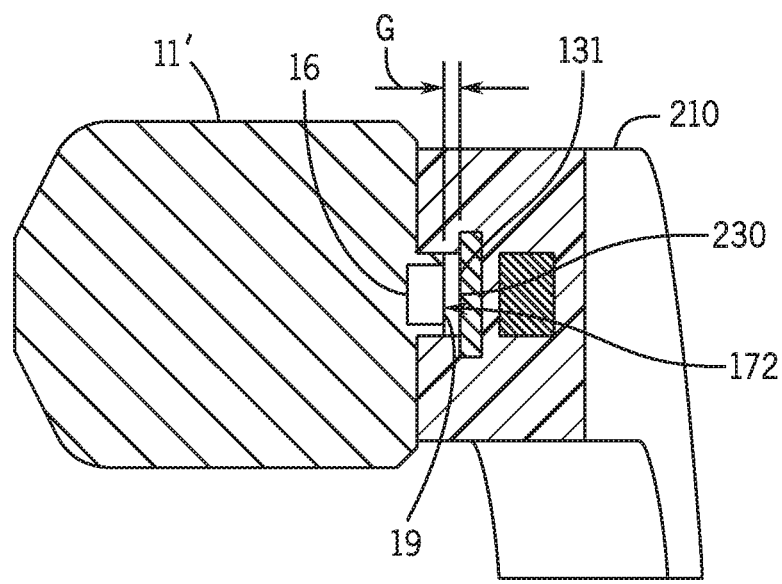
FIG. 4C shows a transverse plan cross-sectional view of a temple and electronic wearable device according to another embodiment.

The eyewear system 95 may include an electronic wearable device (e.g., camera 11) which is configured to attach and detach from the temple guide. The electronic wearable device (e.g., camera 11) may include a device guide (e.g., camera guide 19 as shown for example in FIG. 2B) which may be configured to engage the guide 118 of eyewear 100. Further aspects of the device guide will be described with reference to camera guide 19 but it will be understood that these aspects may apply to device guides on different types of electronic devices. The camera guide 19 is shaped for slidable engagement with the temple guide 118 of the eyewear 100. The camera guide 19 in this example is a male guide in the form of a protrusion attached to or integrally formed with the housing. The camera guide is configured to be inserted into a female guide (e.g., track 130) on the temple along a direction perpendicular to the base of the track. The camera guide 19 includes at least one magnet 16, e.g., as shown in FIG. 4B which illustrates further details of the camera 11. The one or more magnets can be a rare earth neodymium type magnet or other type of magnet. In the illustrated example, the magnets are cylindrical (e.g., disc) magnets however other shapes and configurations may be used. Any number of magnets, for example one to six magnets, may be used to provide sufficient force to retain the camera on the temple. The force of attraction between the magnets and ferromagnetic material of the guide surface, which can be defined based on a measured force required to pull the magnet off the magnet attracting surface (i.e., a pull force), may be tailored to provide enough force to maintain the camera in attachment with the temple without inhibiting the sliding of the magnet or otherwise affecting the optics of the eyewear. That is, the pull force may be sufficiently high to keep the camera attached to the temple while sliding yet low enough so as not to inhibit the movement of the camera and also to ensure that the temple is not significantly deflected which may affect the optical performance of the eyewear and/or result in damage. In some examples, the pull force may range from about 0.5 Newtons to about 10 Newtons. In some examples, the pull force may range from about 1.5 Newtons to about 5 Newtons. That is, the magnet (s) may be attracted to the ferromagnetic material of the temple by a force within the range of about 1.5 Newtons to about 5 Newtons. In some examples, the pull force may be less than 0.5 Newtons or exceed 10 Newtons.

The number and size of magnets may be tailored. A relevant magnet property that may be taken into consideration is the maximum pull force. Also, pole orientation, magnetic direction, field shape and other properties of the magnets may be considered when tailoring the magnet configuration in the device guide. Also, although the examples herein describe temple guide and device guide that include a magnetic material and a magnet, respectively, it will be understood that this arrangement may be reversed, e.g., the magnet may be provided on the temple and the ferromagnetic material may be provided on the electronic wearable device.

Figure 17A:
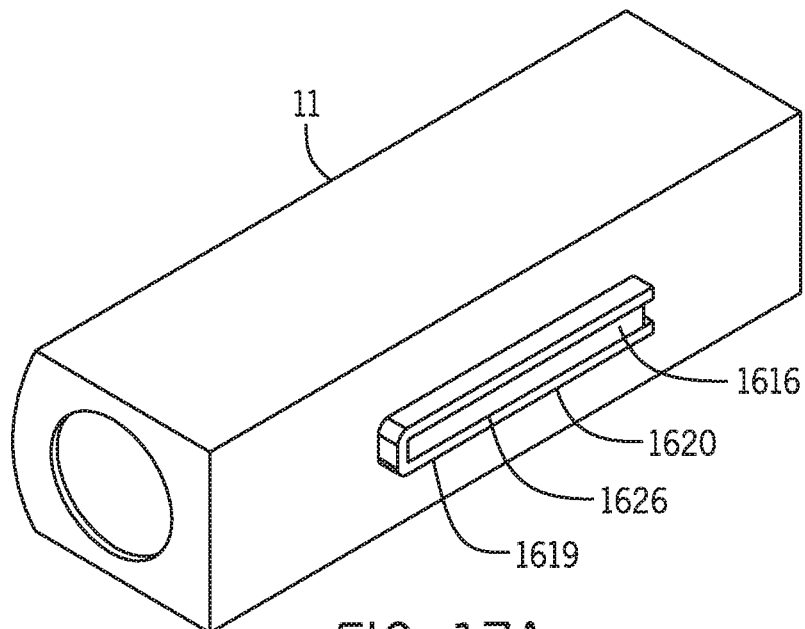
FIGS. 17A-17C show views of a camera with a device guide in accordance with an embodiment of the present disclosure.
Figure 17B:
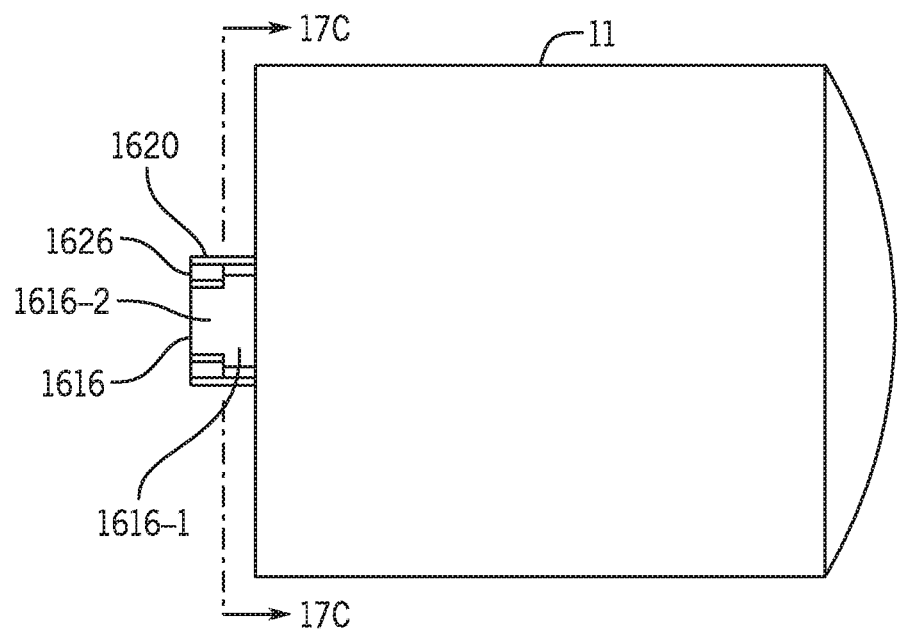
Figure 17C:
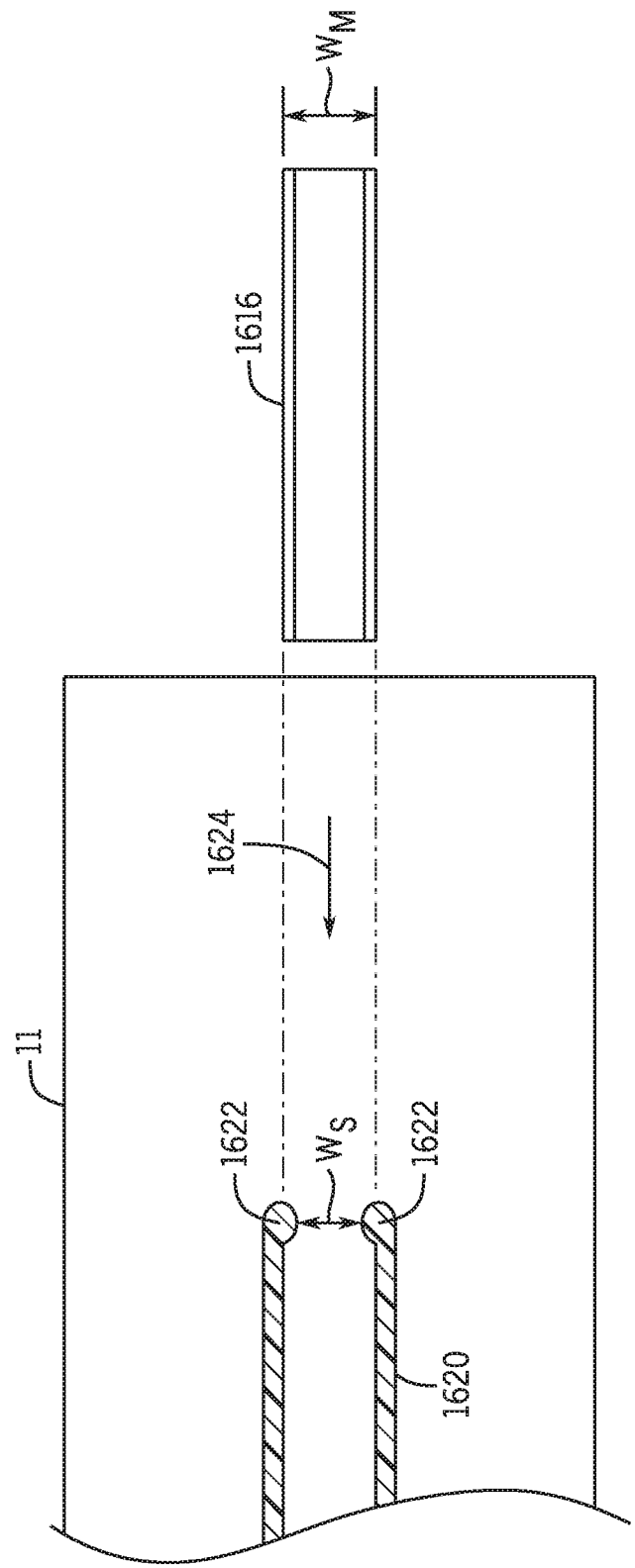
Figure 18A:
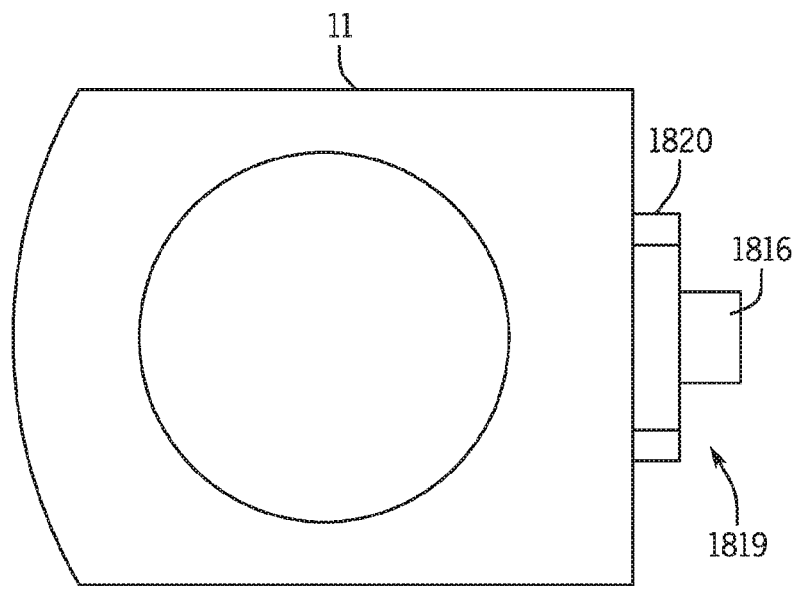
FIGS. 18A and 18B show views of a camera with a device guide in accordance with another embodiment of the present disclosure.
Figure 18B:
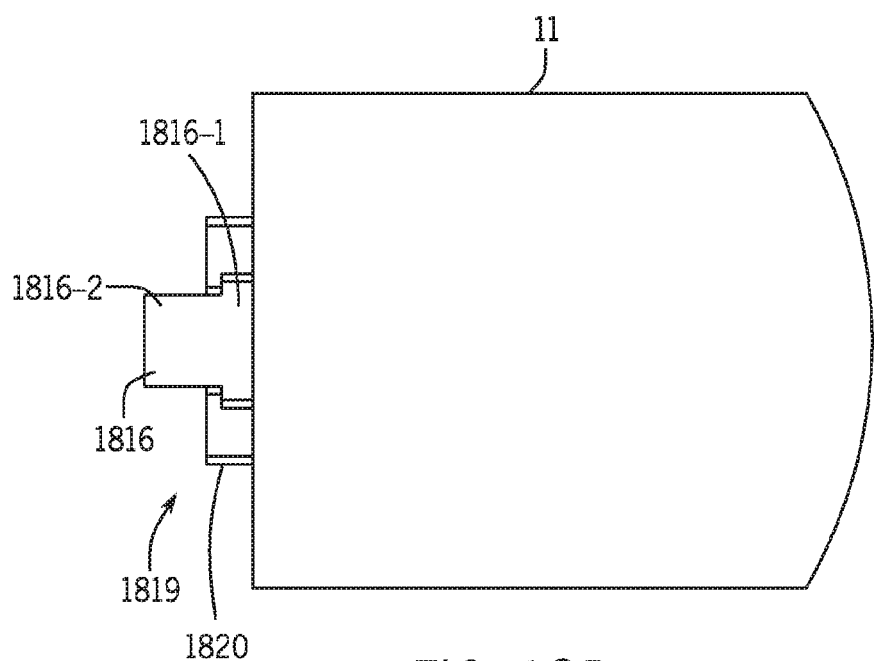
Figure 19:
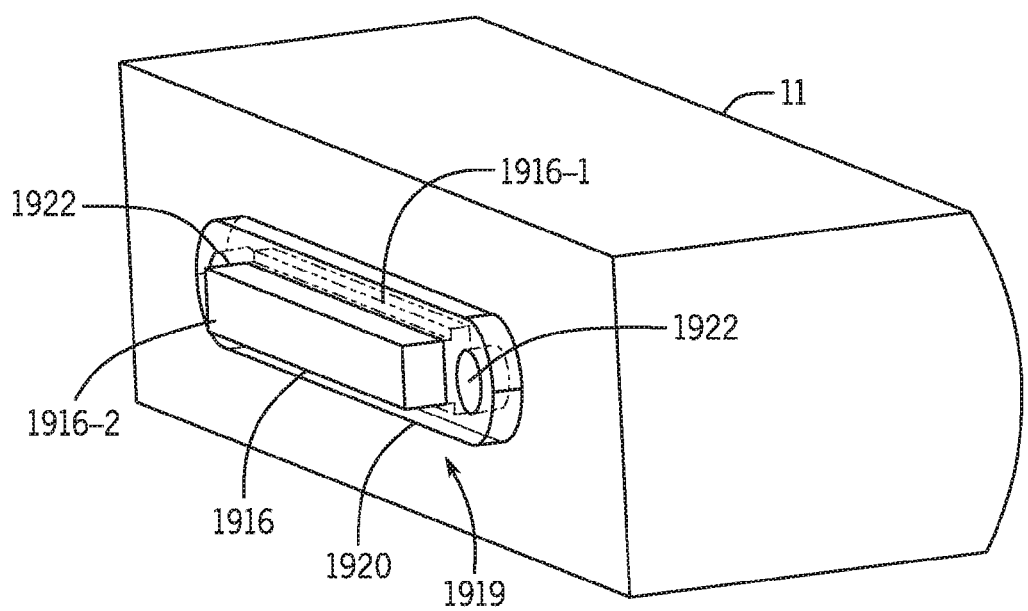
FIG. 19 shows a view of a camera with a device guide in accordance with an embodiment of the present disclosure.

In some examples one or more bar magnets may be used, e.g., as in the examples shown in FIGS. 17-19. In the embodiment in FIGS. 17A-17C, the camera 11 includes a camera guide 1619, which includes custom shaped bar magnet 1616. The bar magnet 1616 is T-shaped with the exposed side of the magnet being narrower than the side that closer to the camera body. That, is the magnet 1616 includes a wider bottom portion 1616-1 and a narrower top portion 1616-2. In one non-limiting embodiment, the magnet has a height of about 1.5 mm a width at the narrow portion of about 2.0 mm and a length of about 12 mm. Other dimensions may be used as may be desired for a particular configuration of a device guide and corresponding temple guide. The slotted protrusion 1620 is similarly shaped having the width of the slot being wider at the bottom (e.g., closer to the camera body) and narrower at the top. This arrangement mechanically retains the magnet within slotted protrusion 1620 such as when magnetic force is experienced due to attraction with the temple guide. During assembly, the magnet 1616 is inserted into the slotted protrusion 1620 to form the camera guide 1619. In some examples, the magnet 1616 may be additionally attached to the camera 11 for example using an adhesive or other conventional fastening technique. In other embodiments, the magnet may not be adhered to the camera but may instead be retained in the slot via a snap feature. As shown in cross-section in FIG. 17C, the walls of the slotted protrusion 1620 may include a lip 1622 at the open end (e.g., insertion end) of the slotted protrusion 1620. The width of the slot at the lip Ws may be slightly less the width of the magnet $W_M$ such that the lip 1622 is temporarily deformed during insertion of the magnet, such as along direction 1624, and then returns to its nominal shape to retain the magnet in the slot. In some examples, the exposed surface of the magnet may be flush (e.g., in plane) with the bottom surface 1626 of the protrusion, as shown in FIG. 17B. In other examples, as described herein, the magnet may be recessed from the bottom surface 1626 of the protrusion.

FIGS. 18A and 18B show another embodiment of a camera 11 with a device guide 1819 which is in the form of a male guide. The device guide 1819 includes a T-shaped bar magnet 1816 similar to the bar magnet 1616 of the example in FIGS. 17A-17C. The wider bottom portion 1816-1 is retained in a slotted protrusion 1820 which is shorter in height than the magnet 1816. As such, the upper narrower upper portion 1816-2 is fully exposed and functions as the portion that is inserted into the temple guide. In other words, the height of the exposed magnet portion (e.g., upper portion 1816-2) is substantially the same as the depth D of the track and the width of the exposed magnet portion (e.g., upper portion 1816-2) is substantially the same as the width W of the track. The magnet 1816 may be similarly retained in the slot of the protrusion 1820, e.g., by a lip portion. In other examples, the magnet 1816 may be additionally or alternatively attached to the camera by an adhesive or other means.

FIG. 19 shows yet another embodiment of a camera 11 with a device guide 1919 in the form of a male guide. A portion of the device guide 1919, namely the exposed portion of the magnet 1916 is configured for insertion into a temple track. Similar to the magnet 1816 of the previous example, the magnet 1916 includes a wider lower portion 1916-1 and a narrower upper portion 1916-2. The lower portion 1916-1 is enclosed by the retention plate 1920 which acts to attach the magnet 1916-1 to the camera 11. The upper portion 1916-2 is exposed and similarly configured as upper portion 1916-2 to function as the portion that is inserted into the temple guide. The retention plate 1920 may be laser welded to the camera via the bosses 1922 or otherwise attached such as with conventional fasteners (e.g., bolts, rivets, snap features, etc.).

Figure 2C:
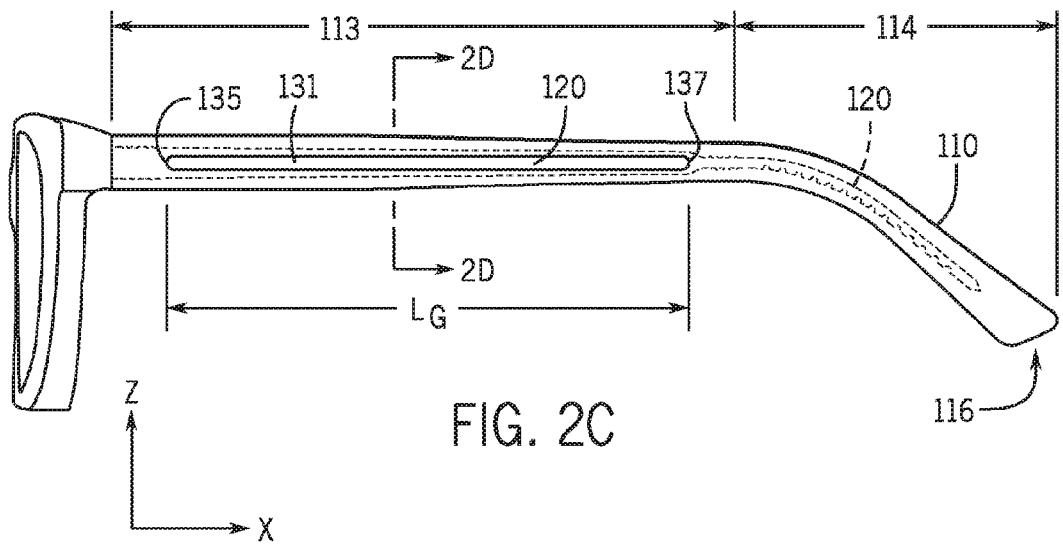
Figure 2D:
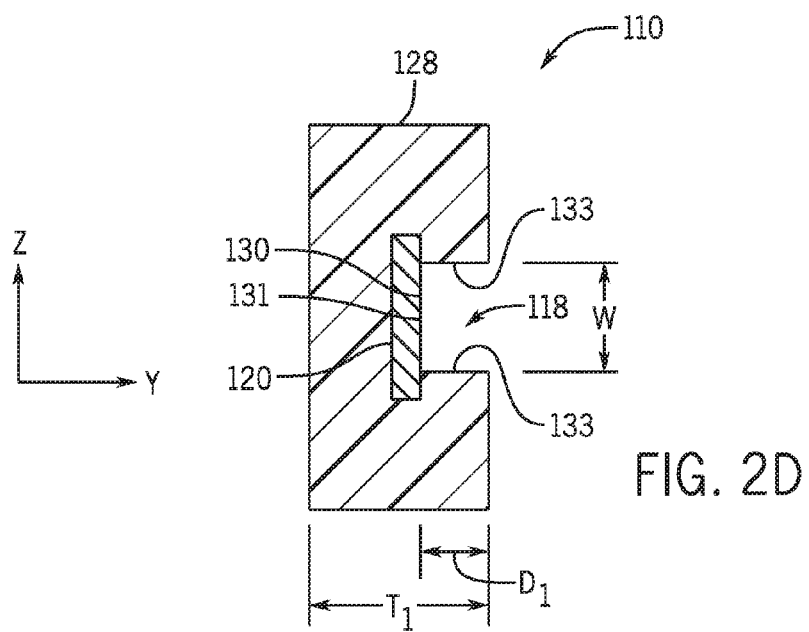

Referring now back to FIGS. 2B-2D, the temples 110 may each include an insert 120. The insert 120 may be a metal insert (also referred to as core wire or stiffener), which may function to structurally reinforce the temple 110. In the embodiment in FIGS. 2A-2D, the insert 120 is formed of a ferromagnetic material, such as spring steel, stainless steel (e.g., AISI 420), or combinations thereof. In other examples, the insert may comprise AISI 301 steel, series 400 stainless steel, ferritic stainless steel, martensitic stainless steel, duplex stainless steel. In some examples, the ferromagnetic material may have magnetic permeability in the range of 1.3-700. In some examples, ferromagnetic material may have magnetic permeability in greater than 700. The insert 120 may be enclosed or substantially enclosed by a second material 128 (also referred to as outer material) to form the temple 110. The second material 128 may be different from the material from which the insert is formed. For example, the second material 128 may be plastic, such as an injection molded plastic or acetate. In some examples, the second material 128 may be metal, e.g., a different metal than that of the insert, such as a non-ferromagnetic metal. The insert 120 may extend from a hinge portion 125 towards a distal end 116 of the temple 110. In some examples, the insert 120 may be connected to the hinge portion 125. For example, the temple 110 may include a hinge barrel 126 which is configured to receive a hinge pin 127 for pivotally securing the hinge portion 125 to the lens-retaining portion 102. In some examples, the hinge barrel 126 may be metal and may be rigidly connect to (e.g., welded to or integrally formed with) the insert 120. In other examples, the insert may not be connected to the hinge portion.

In some examples, the temple guide 118 may be implemented in the form of a female guide (e.g., a track 130). In other examples the temple guide 118 may have a different shape or configuration. For example, the temple guide may be in the form of a male guide (e.g., a rail), examples of which will be described further with reference to FIGS. 11-13. The temple guide 118 may include one or more guide surfaces, e.g., base, sidewalls, top surface, or other depending on the configuration of the guide. In the embodiment in FIGS. 2A-2D, the temple guide 118 is implemented in the form of a track 130, which is defined by a groove formed in the second material 128. The track has a bottom surface or base 131 and sidewalls 133. The track has a width W defined by the distance between the sidewalls 133. The track terminates at a forward end 135 defined by a forward end wall 136 and an aft end 137 defined by an aft end wall 138. The track extends to a depth D which exposes the insert 120. Thus, the insert 120 functions as both a stiffening member (e.g., core wire) for the temple and also provides a ferromagnetic base for the track 130 for magnetically attaching an electronic wearable device thereto. In some examples, the width W may be constant along the length $L_G$ of the guide. In other examples, the track may taper (e.g., the width W may narrow) towards the forward end 135, the aft end 137, or both. In some examples the track may be have an open forward end and/or an open aft end and the taper may prevent the electronic wearable device from sliding out of the track. In some examples, the width W may be constant along the depth D, the track thereby having a generally rectangular cross section. In such examples, the electronic wearable device (e.g., camera 11) may be attachable and removable from the track 130 by insertion of the device guide (e.g., camera guide 19) into the track 130 along a direction perpendicular to the base 131 (e.g., a direction parallel with the Y direction).

In specific exemplary but non-limiting embodiments, the width of the track may not exceed 2.5 mm (e.g., the width W is about 2 mm), the depth of the track may not exceed 1.5 mm (e.g., the depth D is about 1.25 mm), the forward end of the track may be located from about 5 mm to about 20 mm distally from the hinge portion, plus or minus engineering tolerances (e.g., plus or minus 10-15% of the specified dimension based on the appropriate tolerances) and the track spans between about 45% to about 85% of the length L of the temple. In some embodiments, the length of the track may be less than 45% or greater than 85% the length of the temple.

Embodiments of the present invention may be implemented in temples having a variety of shapes and size, for example temples having a relatively simple profile or the temples that contoured in one or more directions. For example, as illustrated in FIGS. 2A-2C, the temple 110 may follow a curved profile viewed in plan. That is, the temple 110 may include a generally flat portion 111 and a contoured portion 112. The flat portion 111 may extend from the hinge portion 125 to about ¼ or ⅓ of the length L of the temple, although in other examples the flat portion 111 may be shorter than ¼ of the length L of the temple or longer than a ⅓ of the length L of the temple. The contoured portion 112 may extend from the flat portion 111 to the distal end 116. The contoured portion 112 may define a generally simple curve (e.g., a C-shaped curve) or a more complex curve (e.g., an S-shaped curve, in which the contoured portion curves in one direction and then flattens out or curves in an opposite direction as you move towards the distal end). In some examples, as in the embodiment in FIGS. 1-4, the guide 118 extends at least partially along both of the flat and contoured portions 111 and 112. In such examples, the guide follows the curvature of the temple. In such examples, the curvature (e.g., minimum temple radius $R_{MIN}$, see e.g., FIG. 4B) may be selected to ensure that device guide remains in engagement with the temple guide along the full length of the temple guide. In some examples, the minimum temple radius may be about 90 cm. In other examples, the temple, when viewed in plan, may be contoured along substantially all of the length of the temple and may not include a flat portion 111, and the curvature may be such as to ensure that the device remain in engagement with the temple guide when moved along the length of the temple guide. In yet further examples, the temple, when viewed in plan, may be generally flat along substantially the full length of the temple. In some examples, the temple guide may span only a generally flat portion of the temple (such as in the embodiments in FIGS. 14-15).

When viewed from the side (see e.g., FIG. 2C), the temple 110 may include an arm portion 113 and an earpiece portion 114. The arm portion 113 may extend generally straight aft from the hinge portion 125 towards the distal end 116 of the temple. The arm portion 113 may span more than half (e.g., 60%, 70%, 75%, 80% or other) of the length L of the temple 110. In some examples, the arm portion 113 may include part or all of the flat portion 111 and at least part of the contoured portion 112. The earpiece portion 114 may extend from a bend which is positionable over the wearer's ear to the distal end 116 of the temple. The earpiece portion 114 may curve downward such that the distal end 116 of the temple is positionable behind the ear of the user, e.g., to secure the temples to the user's head when the eyewear is worn. In accordance with the examples herein, the guide 118 may span one or more of the above described portions of the temple 110. In some examples, the guide 118 may span most of the length of the arm portion 113 but may not extend along the earpiece portion 114. The guide 118 may therefore be generally straight along its longitudinal direction and may thereby restrict movement of the electronic wearable device along a straight path. In other examples, the guide 118 may extend along only a small portion (e.g., 50 or less) of the arm portion 113. In yet further examples, the guide 118 may extend at least partially along both of the arm and the earpiece portions 113 and 114, respectively, and the guide 118 may therefore guide the electronic wearable device along a curved path.

The temple and device guides may be configured such that the electronic wearable device is positionable substantially flush with a front face of the eyewear. For example, the forward end 135 of the track 130 may be spaced from a font face of the eyewear by an offset distance O (see e.g., FIG. 2B) substantially matching the distance between the forward face of the electronic wearable device and the forward end of the device guide.

In one specific embodiment the electronic device includes a plurality of cylindrical magnets (e.g., 1-6 magnets having a diameter of about 1/16 inches), each of which may be an NdFeB with Ni plating axially magnetized with 0.12 lbs pull force. The size and pull force of the magnets may be tailored taking into account the form factor of the electronic wearable device and the required force to maintain the electronic wearable device in magnetic attachment with the temple while still enabling the electronic wearable device to be slidable along the track. In some examples, the magnets may be spaced from the base by a gap when the electronic wearable device is attached to the track. In such examples, the magnetically attached electronic wearable device may essentially float over the surface of the track (e.g., the base 131) which may improve slidablity of the electronic wearable device along the track and or reduce the risk of scratching the aesthetic surface of the eyewear. In some examples, the base 131 may be coated with an additional layer, which may be aesthetic or functional. For example, the base 131 may be coated with a friction reducing layer (e.g., a low-friction material such as TEFLON). In some examples, the base 131 may be coated with a corrosion resistant material. In some examples, the additional layer may be a layer or paint such as to paint the base in a color matching the color of the second material or to paint the base in an accent color. In some examples, the base 131 may be coated with a lacquer, paint, varnish or any other type of coating. In some examples, the base 131 may be plated with nickel, copper, zinc, gold, silver, or combinations thereof.

FIGS. 3A and 3B show an insert 220 prior to its assembly into a temple (e.g., temple 110). The insert 220 may be a generally flat elongate member, which may be formed for example by stamping a thin metal strip in the desired shape (e.g., as shown in FIG. 3B) from bulk material such as stainless or spring steel sheet metal. In some examples, the insert 220 may be generally flat along the entire length of the insert. The insert may be made from steel, stainless steel, for example steel alloy with minimum 10.5% chromium content by mass, or others. Different alloys of steel may be used and relevant properties to be considered in determining a suitable alloy may include level of hardness (e.g., martensitic microstructure) and nickel content. In some examples, the insert 220 or a portion thereof may be coated, for example a side of the insert that is exposed and provides a guide surface may be coated with a corrosion resistant material, a friction reducing material, a colored material such as paint which may be the same as the color of the other material or an accent color, or another type of coating. In some examples, the insert 220 may be so coated before assembly into the temple. In other examples, only the exposed portion of the insert 220 may be coated after the insert has been assembled into the temple.

The insert 220 may optionally include one or more grippers 221 configured to resist relative lengthwise movement between the insert 220 and the outer material enclosing the insert (e.g., second material 128). The grippers 221 may be implemented as textured portions which may increase the friction between the insert 220 and the outer material. The grippers 221 may be located at one or more locations along the length of the insert 220, for example at a forward end and/or at an intermediate location along the length of insert 220. Grippers may be provided along any surface of the insert 220. The insert 220 may include a forward portion 223 and an aft portion 222. The forward portion 223 may have a length selected to substantially correspond to the length of a straight portion of the temple (e.g., straight portion 113). The aft portion 222 may have a length selected to substantially correspond to the length of a curved portion of the temple (e.g., curved portion 114). The forward portion 223 may be wider than the aft portion 222. The forward portion 223 may be wide enough to serve as a base of the track. In other words, the width $W_1$ of the forward portion 223 may be greater than the width W of the track 130. The width of the insert may range from about 2.5 mm to about 6 mm or greater and the thickness $T_1$ may range from about 0.3 mm to about 1 mm or greater depending on the geometry of the temple. In one specific non-limiting embodiment, the insert may have a width $W_1$ of about 4.8 mm and a thickness $T_1$ of about 0.6 mm. Other dimensions may of course be used in other embodiments. In an exemplary non-limiting embodiment, the width of the forward portion 223 may be from about 3.0 mm to about 5 mm, in some examples from about 3.5 mm to about 4.8 mm, although this width may be different depending on the particular temple design. The width of the aft portion 222 may be half or less of the width of the forward portion 223. The aft portion may include one or more notches 225 arranged along the lower side of the aft portion 222, an upper side of the aft portion 222, or along both sides of the aft portion 222. The notches 225 may enable the aft portion 222 to be more easily deformed to a shape corresponding to the curved portion of the temple (e.g., as shown in FIG. 2C), as well as enable further adjustments of the shape of the temple (e.g., a curvature of the curved portion) to fit a particular user.

The insert (e.g., core wire) may be attached (e.g., welded) to a hinge barrel inserted into a softened injection molded plastic temple. In other examples, a plastic temple may be insert molded around the core wire, with the temple being both shaped and attached to the core wire during the cooling/curing phase. In yet further examples, the insert may be embedded in an acetate laminate temple which can then be shaped and polished to achieve its final aesthetic look. The optional grippers, particularly in cases in which the insert is not attached to the hinge, may improve the attachment between outer material and insert. In some examples, the track may be formed in the temple after the temple and core wire have been assembled, e.g., by cutting, such as by laser cutting, a slot in the plastic material to a depth that reaches the flat insert. In other examples, the track may be initially formed during the molding process, e.g., by using a mold or additional/removable inserts to define the shape of the track during the molding process.

In some examples, the eyewear system may include a safety catch 180. The safety catch 180 may be configured to prevent separation of the electronic wearable device (e.g., camera 11) from the eyewear 100 in the event that the electronic wearable device becomes inadvertently disengaged from the guide 118. The safety catch 180 may include a strap 182 (e.g., a securing ring, a lanyard, or another), which is secured to the electronic wearable device (e.g., camera 11) and the eyewear frame 101. In some examples, the strap 182 may be made from plastic, for example a flexible plastic material. In some examples, the strap 182 may be a securing ring which encircles a cross section of the temple 110. The securing ring may be made from translucent or transparent material. In other examples, the strap 182 may be the same color as the color of the temple. In some examples, the securing ring may have a cross sectional core thickness of less than 1.5 mm. In some examples, the strap 182 may be made from a monofilament strand or string of nylon, polyvinylidene fluoride (PVDF), polyethylene, DACRON, DYNEEMA, or others. In some examples, the strap 182 may be made from an elastic material such as rubber. For example, the strap 182 may be made from an elastomer such as silicon rubber. Other materials, such as natural fibers or synthetic materials may be used. The strap may be made from metal (e.g., single or multi-strand wire, a chain, or others). The strap 182 may be attached to a securing feature 184 provided on the electronic wearable device. Other configurations may be used for the safety catch, examples of some of which are further described below with reference to FIGS. 5A-5C.

Referring now to FIGS. 4A and 4B, partial cross-sectional views of eyewear system in accordance with another embodiment are shown. The temple 210 includes a temple guide 118 in the form of a track 230 provided on an outside side 207 of the temple 210. The temple 210 may include an insert 224 (e.g., a core wire), which increases the stiffness of the temple 210. The insert 224 need not be ferromagnetic as the insert in this embodiment does not form part of the magnetic track. In this embodiment, the temple additionally includes a strip 229 made from ferromagnetic material (also referred to as metal strip) arranged at the base 131 of the temple guide 118. The strip 229 may be provided by depositing a layer of metallic material onto a surface of the temple (e.g., along the base of the slot that defines the track) or by attaching (e.g., by bonding) a separate metallic strip to the base of the track. The strip 229 may facilitate the magnetic attraction between the temple guide 118 and a guide of an electronic wearable device. The strip 229 may be spaced from the insert 224. The depth $D_2$ of the track 230 may be substantially the same in the embodiments in FIG. 2A, although a thickness $T_2$ of the temple 210 in this second embodiment may be greater than the thickness $T_1$ of the temple 110 in the first embodiment where the insert provides the functionality of both a stiffening core wire and a magnetic base of the track 230. In some examples, the insert may be omitted. In some examples, the depth D of the track 230 may be up to about 1 mm. In such examples, the temple may be made substantially from a non-metallic material (e.g., injection-moldable plastic or acetate) except for a thin layer (e.g., a coating) of metallic material provided along the base of the track. Such a layer may not significantly increase the stiffness of the temple to act as a stiffener but would otherwise facilitate magnetic attraction between the temple guide 118 and a guide of an electronic wearable device.

FIG. 4B shows a partial plan cross-sectional view of the temple 210 and an exemplary electronic wearable device (e.g., camera 11) attached to the temple 210. The camera 11 includes a device guide 19 which is configured to be received, at least partially, within the track 230.

C shows a partial plan cross-sectional view of a temple 310 and an exemplary electronic wearable device (e.g., camera 11') attached to the temple 210 in accordance with another embodiment. In this illustrated embodiment, the eleee rnic wearable camera 11' includes a camera guide 19 which is configured to be received, at least partially, within the track 230. The track 230 includes a base 131 which is defined by a ferromagnetic material of the temple (e.g., an exposed surface of a ferromagnetic insert as in the example in FIG. 2D, or a ferromagnetic layer such as the strip 229 as in the example in FIG. 4A). The camera guide 19 in this example is a male guide (e.g., a protrusion 172). One or more magnets 16 are attached to the protrusion 172. The one or more magnets 16 may be attached to corresponding recesses in the protrusion 172 or they may be embedded within the protrusion 172 such that the surfaces of the magnets are not exposed. The protrusion 172 may have a top surface, which may be defined by exposed surfaces of the one or more magnets or by a surface of an enclosure in the case where the magnets are embedded. In this illustrated embodiment the protrusion 172 is configured such that the top surface does not contact the base 131 when the camera 11' is attached to the temple 210. The gap G defined between opposing top surface of protrusion 172 and base 131 when the camera 11' is attached to the temple 210 may enable the camera 11' to more easily slide along the temple guide 118 (e.g., float over the base 131 of the track 230). In some examples, the gap G may be less than 0.1 mm. In some examples the gap G may be less than 0.05 mm, such as 0.04 mm, 0.03 mm or 0.01 mm.

It will be understood that any of the embodiments of eyewear systems may be configured to include a gap G between the opposing and magnetically attracting faces of the device guide and temple guide. In other words, the camera 11' and temple guide 118, for example, may be configured such that the bottom surface of the camera guide 19 and the base 131 of the track 130 do not contact during normal use. In some examples, the magnets specifically may be spaced apart from the temple surfaces such as to avoid rubbing of the magnets against any of the aesthetic surfaces of the temple. This spacing may be achieved by recessing the magnet below the bottom surface of the device guide such that the bottom surface of the device guide may contact the base of the track while the magnet itself does not. The bottom surface of the device guide may be part of the housing or attached thereto and may be formed of a plastic material thus reducing the risk of damage to the temples. As will be appreciated, all exposed surfaces of the, such as on the outside side of the temple, including the walls and base of the track, are finished surfaces (e.g., surfaces that function as part of the finished aesthetic look of the eyewear). In other words, the eyewear may be worn with or without an electronic wearable device attached thereto without diminishing the aesthetic look of the eyewear, and in some examples the aesthetic look of the eyewear may be enhanced by the presence of the track. As such, the attachment of an electronic wearable device to the temple is not a necessary condition for a wearer to enjoy the use of the eyewear, e.g., attaching an electronic wearable device or any other type of feature is not essential to provide a finished aesthetic look for the eyewear.

Further examples of safety catches of eyewear systems are described with reference to FIGS. 5A-5C. The safety catch 180' in FIG. 5A includes a lanyard 182 which is attached to the temple 110 and a securing feature 184 attached to the camera 11. Instead of being looped around the temple as described with reference to FIG. 2B, the lanyard is attached to an underside 103 of the temple 110. The lanyard includes a T-shaped fitting 186 which is received in a T-shaped slot on the underside 103 of the temple. The T-shaped slot may span the same or substantially the same distance as the length of the guide 118 such that the lanyard may slide along with the camera while remaining attached to the T-shaped slot via the fitting 186. The T-shaped slot may have an open end, e.g., at the forward end 115 or the distal end 116 of the temple, to enable removal of the camera 11 from the eyewear frame when desired.

Figure 5B:
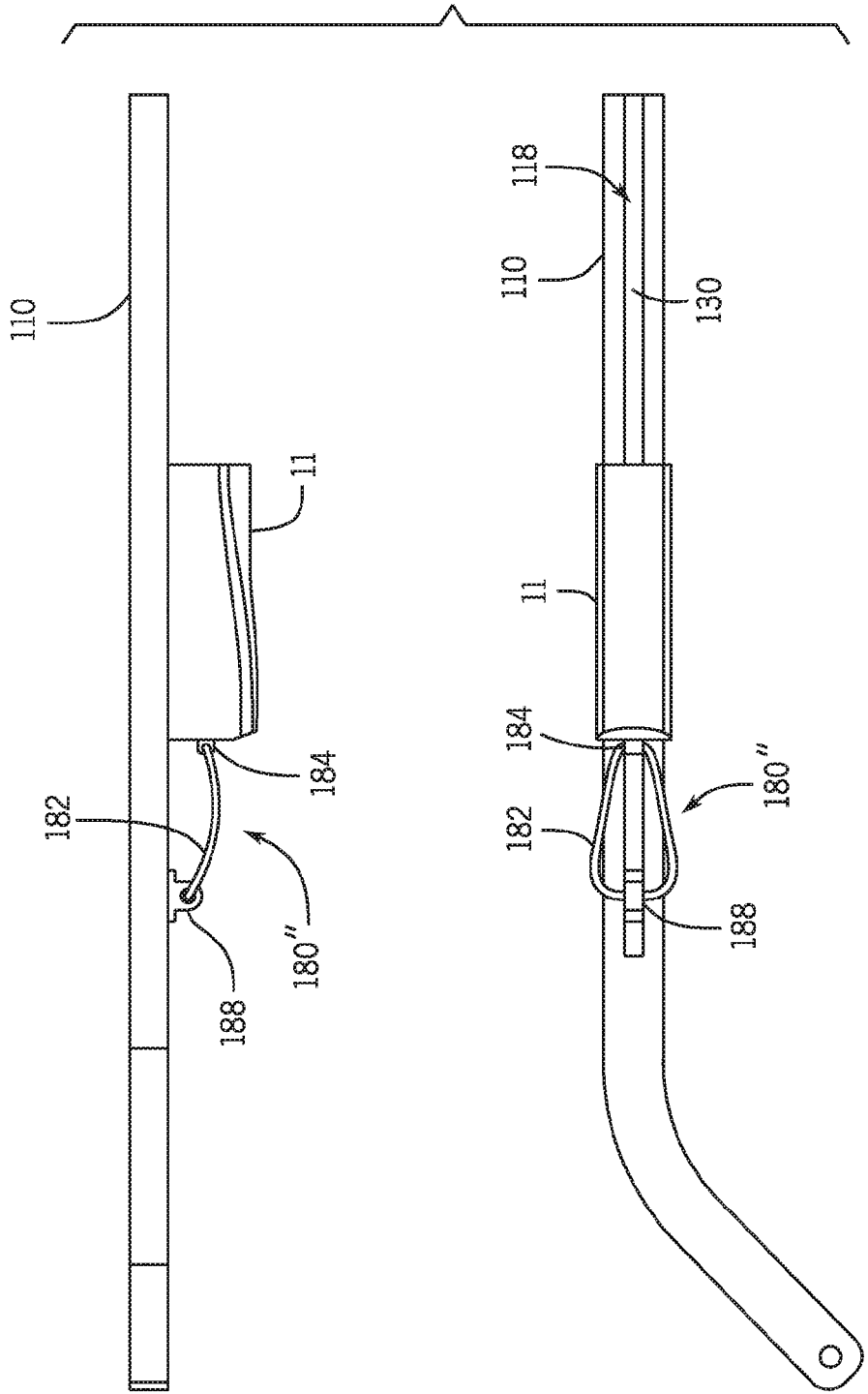

The safety catch 180" in FIG. 5B includes a lanyard 182 which is attached to the temple 110 and a securing feature 184 attached to the camera 11. Instead of being looped around the temple as described with reference to FIG. 2B, the lanyard is attached to a trolley 188 which is also configured to slide along the guide 118. The trolley may be magnetically attached to the guide 118 in a manner similar to the device guide. In some examples, the trolley is configured to exhibit a stronger magnetic attraction with the temple guide as compared to the magnetic force between the device guide and the temple guide. In some examples, the temple guide may shaped to mechanically retain the trolley therewithin.

Figure 5C:
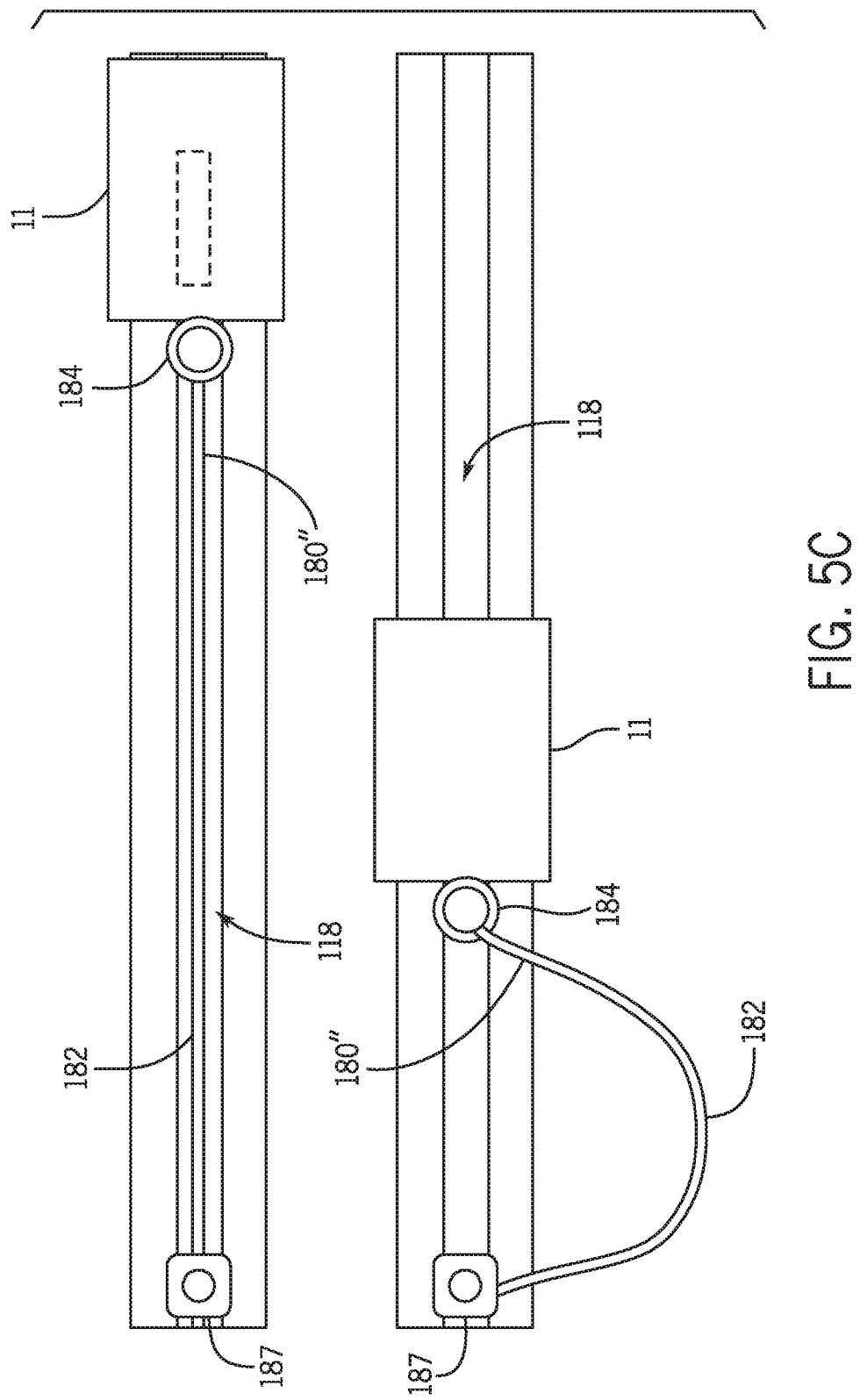

In the example in FIG. 5C, the safety catch 180''' includes a lanyard 182 which is irremovably attached at one end to a fixture 187 disposed at the aft end of the guide 118 and at the opposite end to the securing feature 184. The length of the lanyard 182 is sufficient to allow the camera to move from the aft end all the way to the forward end of the guide. In this manner, the safety catch 180''' maintains the camera 11 tethered to the temple while allowing movement of the camera along the guide.

Figure 6:
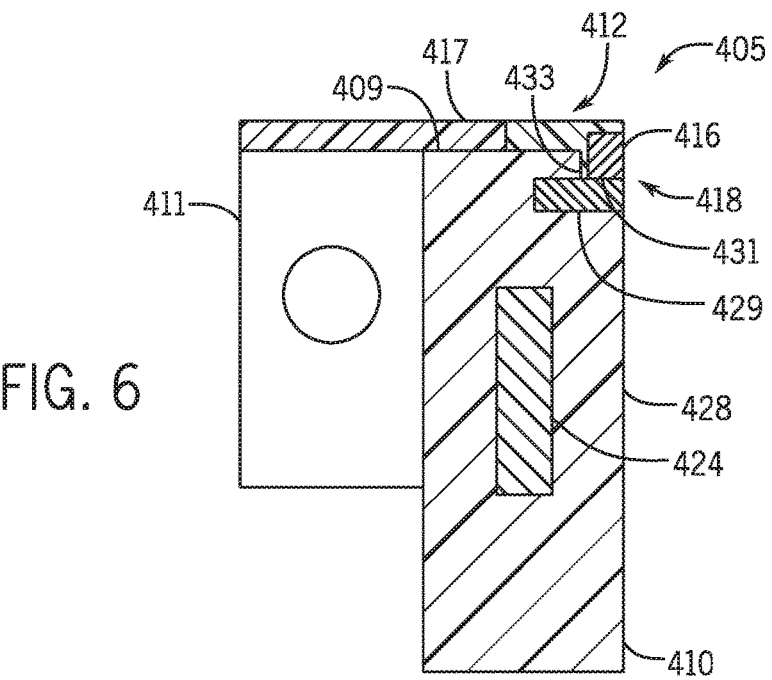
FIG. 6 shows a simplified cross-sectional view of a temple and electronic wearable device attached to the temple according to another embodiment.

FIG. 6 illustrates a simplified cross-sectional view of another embodiment of an eyewear system 405. The eyewear system include a temple 410 of an eyewear frame and electronic wearable device 411 (e.g., camera) attached to the temple 410. The electronic wearable device 411 includes a device guide 412. The device guide 412 may be provided on an arm 417. The arm 417 is configured to be positioned over a top side 409 of the temple 410. The arm 417 may be extendible (e.g., a telescoping arm) such that the electronic wearable device 411 may be attachable to temples of different thicknesses. The device guide 412 includes a magnet 416, attached to the arm. In some examples, a surface of the magnet may be exposed such that it contacts the temple when the electronic wearable device 411 is attached thereto. In other examples, an interface layer may be provided between the magnet and temple surface to reduce damage to the aesthetic surface of the eyewear (e.g., scratches), which may be otherwise caused by a magnet sliding in contact with the eyewear. The interface layer may be provided for example by embedding the magnet slightly below the contact surface of the arm or by a coating provided on the exposed surface of the magnet. The coating may be friction reducing coating.

The temple 410 may include a temple guide 418. The temple guide in this example is located on the top side of the temple 410. The temple guide is in the form of a female guide (e.g., track) which includes a ferromagnetic strip 429 provided at the base of the guide. The temple 410 may optionally include an insert 424, which may or may not be ferromagnetic, and an outer material 428 which encloses the insert. In accordance with the examples herein, the temple guide 418 includes guide surfaces (e.g., base 431 and sidewall 433), which constrain movement of the electronic wearable device 411 in one or more directions relative to the temple. At least one of the guide surfaces, in this example base 431, is defined by the ferromagnetic material of the strip 429. In other examples, the strip 429 may be arranged such that it defines the sidewall 433 instead of the base 431, such as by positioning the strip closer to the top side 409. In other examples, the strip 429 may be arranged such that it defines both the sidewall 433 and the base 431, such as by using an L-shaped ferromagnetic member to define the shape of the track.

Figure 7:
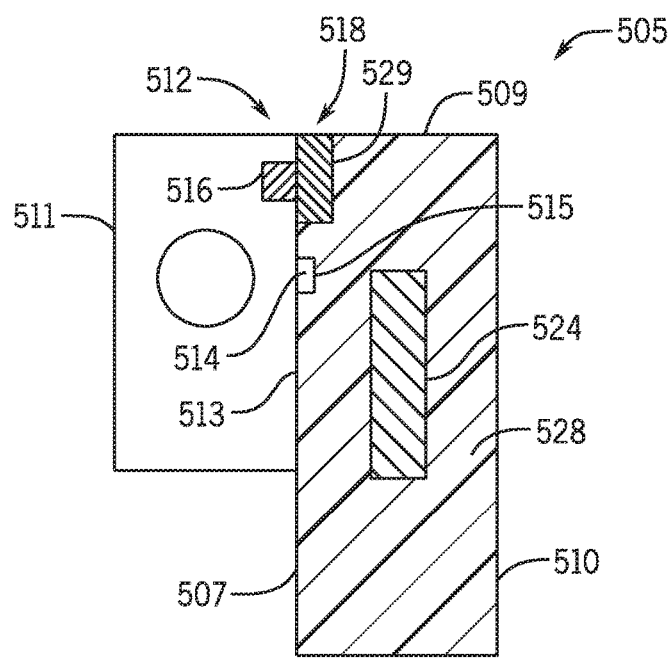
FIG. 7 shows a simplified cross-sectional view of a temple and electronic wearable device attached to the temple according to yet another embodiment.

FIG. 7 illustrates a simplified cross-sectional view of another embodiment of an eyewear system 505. The eyewear system includes a temple 510 and electronic wearable device 511 attached to the temple 510. The electronic wearable device 511 includes a device guide 512, which may be provided along a side 513 of the electronic wearable device 511. The device guide 512 may include a magnet 516 and optionally a guide protrusion 514 spaced from the magnet. The temple may be formed of a material 528 and may optionally include a core wire 524 embedded in the material 528. The temple 510 may include a temple guide 518. The temple guide 518 may include a ferromagnetic strip 529 which may be flush with the outer surface of the material 528. The temple guide 518 may optionally include a groove 515 spaced from the strip 529 and shaped to receive the protrusion 514. The magnet 516 may be arranged to engage the strip 529 when the side 513 of the electronic wearable device 511 is positioned against the outside side 507 of the temple 510. The protrusion 514 and groove 515 may serve as locating and interlocking features, e.g., to position the electronic wearable device 511 for engagement with the temple guide 518 and to restrict movement of the electronic wearable device 511 in one or more directions relative to the temple 510 while the electronic wearable device 511 remains attached thereto. In the illustrated example, the strip 529 is positioned near a top side 509 of the temple 510 and a single groove 515 is provided spaced downward from the strip 529. In other examples the strip may be different positioned and a different arrangement and number of grooves may be used.

Figure 8A:
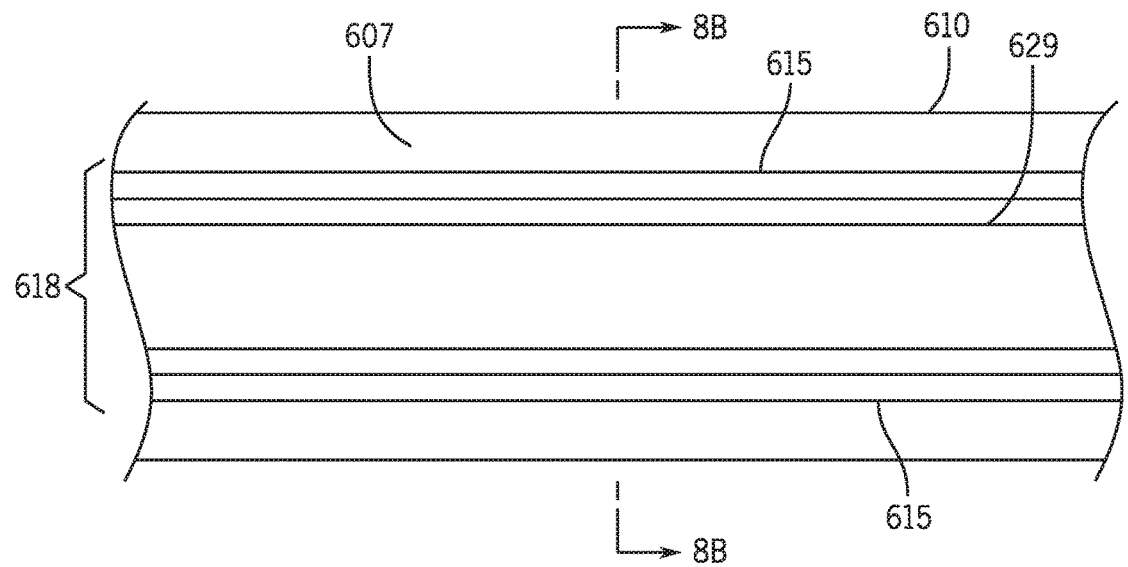
FIGS. 8A and 8B show partial side and cross-sectional views of a temple according to another embodiment.
Figure 8B:
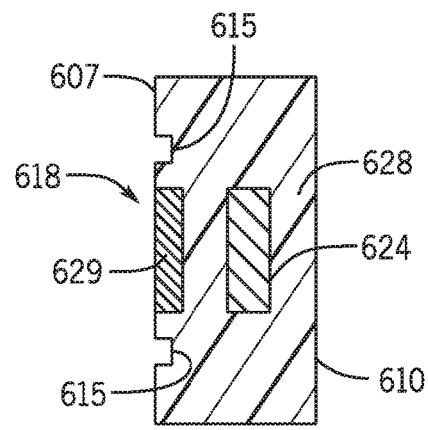

For example, FIGS. 8A and 8B illustrate partial side and cross-sectional views of a temple 610 in accordance with another embodiment. The temple 610 may be formed of a material 628, such as plastic, and may optionally include a core wire 624 embedded in the material 628. The temple 610 includes a guide 618 that includes a ferromagnetic strip 629 positioned substantially flush with the outside side 607 of temple 610. One or more grooves 615 may be provided spaced apart from and extending along the length of the strip 629. Each of the grooves may be configured to engage a corresponding protrusion on an electronic wearable device (not shown in this view). In this manner, the guide 618 may be configured to magnetically retain the electronic wearable device in attachment (e.g., by magnetic attraction) to the temple and may further function to restrain movement of the electronic wearable device in one or more directions (e.g., up and down, in-plane rotation, etc.) relative to the temple.

Figure 9A:
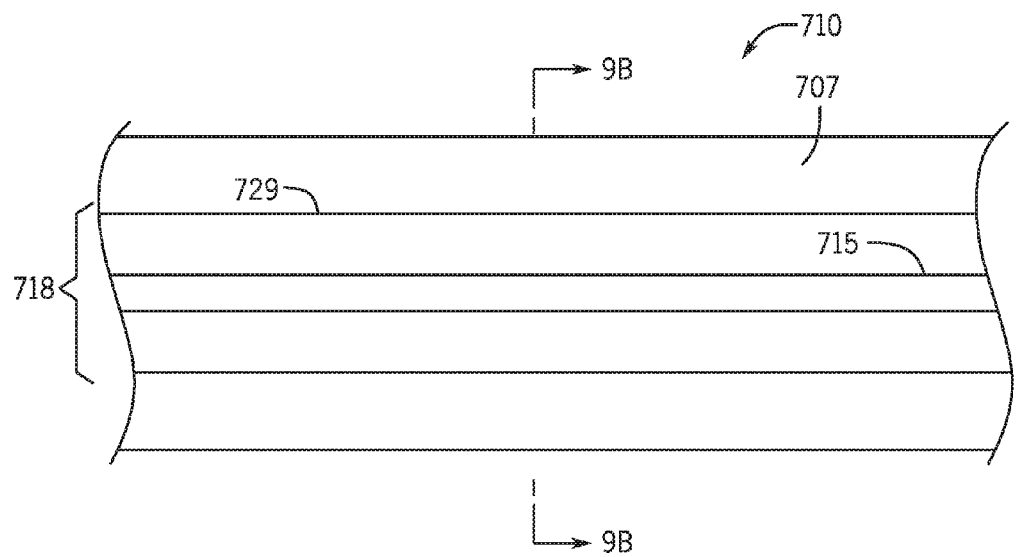
FIGS. 9A and 9B show partial side and cross-sectional views of a temple according to yet another embodiment.
Figure 9B:
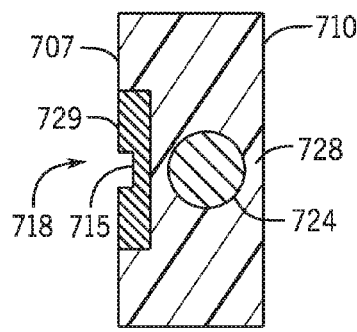

In another example, as shown in FIGS. 9A and 9B, the temple 710 may similarly be formed of a material 728, such as plastic, and may optionally include a core wire 724 embedded in the material 728. The temple 610 may similarly include a guide 718 that includes a ferromagnetic strip 729 positioned substantially flush with the outside side 707 of temple 710. However, in this example, one or more grooves 715 may be provided in the strip 729. The groove 715 may be a generally rectangular channel open to the exposed surface of the strip 729 and extending along the length of the strip 729. The groove 715 may be configured to engage a corresponding protrusion on an electronic wearable device (not shown in this view). In this manner, the guide 718 may be configured to magnetically retain the electronic wearable device in attachment (e.g., by magnetic attraction) to the temple and may further function to restrain movement of the electronic wearable device in one or more directions (e.g., up and down, in-plane rotation, etc. relative to the temple.

Figure 10:
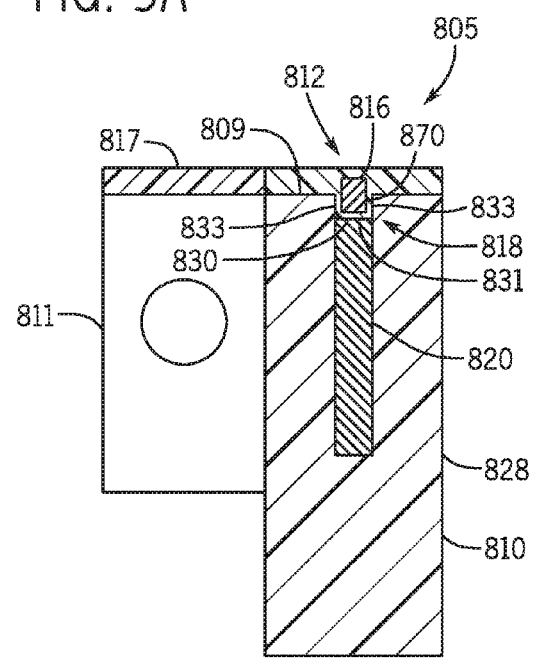
FIG. 10 shows a simplified cross-sectional view of a temple and electronic wearable device attached to the temple according to yet another embodiment.

FIG. 10 illustrates a simplified cross-sectional view of yet another embodiment of an eyewear system 805. The eyewear system include a temple 810 of an eyewear frame and electronic wearable device 811 (e.g., camera) in engagement with the temple 810. The temple 810 is formed of a material 828, such as plastic, and includes an insert 820 made from a ferromagnetic material, e.g., stainless steel. The electronic wearable device 811 is slidably attached to the temple 810 via a temple guide 818. The electronic wearable device 811 includes a device guide 812, which is provided on an arm 817. The arm 817 is configured to be positioned over a top side 809 of the temple 810. The arm 817 may be extendible such as to be positionable over temples of different thicknesses. The device guide is implemented as a male guide (e.g., a protrusion 870) and includes a magnet 816 attached to the arm.

The temple 810 may include a temple guide 818. The temple guide 818 in this example is located on the top side 809 of the temple 810 and is implemented in the form of a female guide (e.g., a track 830). The track is defined by a longitudinal slot formed in the temple (e.g., on the top side 809) and extending to a depth sufficient to expose the insert 820. The guide 818 includes one or more guide surfaces (e.g., base 831 and sidewalls 833 of track 830) which are operable to constrain movement of the electronic wearable device 811 in one or more directions relative to the temple 810. At least one of the guide surfaces, in this case the base 831, is defined by a ferromagnetic material of the temple (e.g., the insert). In some examples, the magnet 816 may be exposed or embedded within the material forming the arm (e.g., a rigid plastic material), which may be the same material as used for the housing of the electronic wearable device 811. In other examples, a coating (e.g., friction-reducing coating) may be provided over an exposed surface of the magnet 816 to reduce the frictional between the magnet 816 and temple 810. In yet further examples, the magnet 816 and/or the bottom surface of the protrusion 870 may be spaced from the base 831 of the track 830 such that the protrusion 870 floats over the base 831 of track 830 with a small gap remaining between the facing surfaces of the protrusion 870 and track 830 when the electronic wearable device 811 is attached to the temple 810.

As will be appreciated, the guides 812 and 818 are configured such as to enable attachment and detachment of the electronic wearable device 811 by insertion of a portion of the electronic wearable device 811 (e.g., the protrusion 870) into the track 830 along a direction perpendicular to the base of the track. In this manner, attachment and detachment of the electronic wearable device 811 may be simplified. Attachment may be achieved by simply placing the electronic wearable device 811 over the temple and allowing the magnetic attraction force to move the electronic wearable device 811 perpendicularly to the track to snap the electronic wearable device 811 into engagement with the temple. As such, attachment and detachment may not require manipulation of any miniaturized or intricate connection components in order to secure the electronic wearable device 811, which may improve the user experience. This functionality may of course apply to other embodiments described herein, such as any of the embodiments describes in FIGS. 1-9 or any of the embodiments described further below.

It will be generally understood that aspects of any of the examples herein may be used in combination with any other examples of the present disclosure. For example, any of the temples described herein (e.g., temple 410, 510, 610, 710, 810, etc.) may be used to implement the temple 24 of FIG. 1 and any of the device guides (e.g., guide 412, 512, 812, etc.) may be used to implement the device guide 12 of FIG. 1. Also, one or more of the aspects of the eyewear systems described with reference to FIGS. 1-5 and also described further below with reference to FIGS. 11-15 may be applied to the examples in FIGS. 6-10.

FIGS. 11-13 show components of an eyewear system according to another embodiment. The eyewear system includes a temple 1110 for eyewear and an electronic wearable device (e.g., camera 1111). A temple guide 1118 is provided on the temple for attaching the electronic wearable device (e.g., camera 1111) to the temple 1110. The temple guide 1118 is implemented as a male guide (e.g., a rail 1170). The rail 1170 protrudes from the outside side 1107 of the temple 1110. The temple 1110 includes an insert 1120 which may be embedded within an outer material 1128 (e.g., plastic) and may function to reinforce the temple 1110.

In some examples, the temple guide 1118 includes a ferromagnetic material (e.g., stainless steel). The ferromagnetic material may be provided as a coating on one or more surfaces of the rail (e.g., on the top surface 1172 and/or sidewalls 1171). In some examples, the rail may be made from the ferromagnetic material. In some examples, the insert may be made from a ferromagnetic material. In some examples, the insert 1120 and temple guide 1118 may be made from the same material and formed integrally with one another. As shown in the illustrated example, the insert and temple guide form a T-shaped beam (see e.g., FIG. 11) along a portion of the length of the temple. In other examples, the insert and rail may be formed of different material and joined together to form the T-shaped beam. Different arrangements, for example an insert and rail combination having a different cross-sectional geometry (e.g., an L-shaped beam, I-shaped beam, U-shaped beam, etc.) may be used. In the illustrated example, the rail is shorter than the length of the insert; however the length of the rail may be increased to provide a longer path for the camera. Of course, a shorter rail may also be used. In some specific non-limiting embodiments, the rail may be about 65 mm to about 100 mm long, in some examples from about 75 mm to about 85 mm, in some examples 80 mm.

The forward end 1135 of the rail 1170, the aft end 1137 of the rail 1170, or both, may be beveled. In some examples, forward end 1135, the aft end 1137, or both may include a hard stop, which prevent the camera from sliding off the rail along the rail direction. In the illustrated embodiment, the rails has a generally rectangular cross section and the camera 1111 may thereby be attached and removed from the rail in a direction perpendicular to the rail (e.g., to top surface 1172). Other cross-sections for the rail may also be used. The rail 1170 may be aligned with a predetermined direction (e.g., a centerline of the temple 1110) and may thus function to align the orientation of the camera 1111 (e.g., a line of sight of the camera 1111) with a predetermined direction (e.g., the centerline of the temple 1110).

The camera 1111 includes a device guide 1112 which is configured to engage the temple guide 1118. The temple and device guides 1118, 1112 respectively may be configured for slidably engagement with one another. In other words, the electronic wearable device (e.g., camera 1111) is slidable along the temple guide 1118 when the electronic wearable device is attached to the temple. For example, the device guide 1112 may define a guide channel 1174 for receiving the rail 1170. In the specific illustrated embodiment, the device guide 1112 includes first and second guide members 1176 which define the channel 1174 therebetween. The guide members 1176 may be configured to each be provided on opposite side of the rail 1170 (e.g., adjacent the sidewalls 1171) to restrict movement of the camera 1111 along the direction defined by the rail 1170. The guide members 1176 may be attached to or integrally formed with the housing of the camera. In the illustrated example, the device guide 1112 is configured to magnetically attach to the temple via the temple guide 1118. To that end, the device guide includes a magnet 1178. The magnet 1178 is disposed in the channel 1174 between the guide members 1176. In some examples, the temple and device guide members 1118, 1112, respectively are configured such that the magnet does not contact the top surface of the rail 1170 when the camera 1111 is attached to the temple. For example, the height of the rail 1170 and the depth of the channel 1174 may be selected such that a gap is maintained between the base of the channel and the top surface 1172 of the rail 1170 while magnetic attraction between the magnet 1178 and ferromagnetic material of rail 1170 maintains the camera 1111 attached to the temple.

FIGS. 14A-D shows an eyewear temple 1410 with a short temple guide in accordance with another embodiment. As illustrated in FIGS. 14A-D, a temple guide 1418 in accordance with the present disclosure may be provided even on very thin temples, such as on thin metal temple also referred to as a wire temple. The temple guide 1418 may extend along only a small portion of the temple, e.g., less than about 50% of the length of the temple, and in some examples less than about 30% of the length of the temple. In some examples, the guide 1418 extends about ⅓ of the length of the substantially straight arm portion of the temple, although in other embodiments, the length of the guide may be different. To that end, the temple 1410 may include a relatively wider landing or forward portion 1480 attached or integrally formed with a relatively thinner aft portion 1482 that curves to form the earpiece portion of the temple. In some examples, the width $W_F$ of the temple at the forward portion may be at least three times greater than the width $W_A$ at the aft portion. Although FIGS. 14A-14D illustrated an embodiment of a temple with rectangular cross-sections, the cross-section of the forward and/or aft portions may be different (e.g., the aft portion may be circular in cross-section). The landing portion 1480 may taper towards the thinner aft portion 1482 at the interface between the two portions.

The guide 1418 may include one or more of the features of guides described herein. For example, the guide 1418 may be in the form of a female guide (e.g., a track) formed in the landing portion 1480 of the temple. The track may include a base 1431 comprising a ferromagnetic material. In some examples, the temple 1410 itself may be made from the ferromagnetic material and the guide may be implemented by a groove cut into the outside side 1407 of the temple, with the material of the temple providing the guide surface. In other examples, the temple 1410 may include a layer or strip 1470 of ferromagnetic material provided at the base of a female guide 1418. In yet further examples, the guide 1418 may be a male guide which is implemented in the form of a protrusion similar to the example in FIG. 11.

In accordance with some examples of the present disclosure, an adapter for attaching a wearable electronic device to an eyewear temple is described. The adapter may be configured to align the electronic wearable device in a predetermined orientation relative to the eyewear temple when the electronic wearable device is attached to the eyewear using the wearable device adapter. The adapter may be configured to position the electronic wearable device to an outside side of the temple when the electronic wearable device is attached to the eyewear using the wearable device adapter.

The adapter may include a body and a metallic feature. The body may be configured to removably attach the adapter to an eyewear temple of a plurality of differently shaped eyewear frames. In some examples, the body may be configured to be provided at least partially around an eyewear temple. For example, the body may define a passage through which the temple may be inserted to secure the adapter to the temple. In some examples, the body may be configured to be adjustable (e.g., stretchable or otherwise adjustable) to accommodate temples of different sizes. That is, the passage may be adjustable from a nominal shape or size to another shape or size. For example, the body may be formed of a stretchable material such as a stretchable plastic material. In some examples, the body may be formed of urethane or rubber (e.g., neoprene rubber). The body may be formed of a material including polyvinyl chloride, acrylic terminated urethane polymer, polyurethane, epoxyacrylate, epoxyurethane, polyethylene, polypropylene, polyethers, polyvinyl acetat, polysiloxane, siloxyacrylate, or combinations thereof. Other materials may be used. In some examples, the body may be formed of a fabric comprising natural or synthetic fibers. The metallic feature of the adapter is attached to the body and configured for magnetically retaining an electronic wearable device in attachment with the adapter.

FIG. 15 illustrates an embodiment of an adapter 1700 for attaching a wearable device (e.g., a camera) to eyewear. The adapter 1700 includes a body 1702 and a magnetic feature 1704. The body 1702 may be configured to removably attach the adapter 1700 to a variety of differently sized eyewear temples. The body 1702 may be in the form a tubular member (e.g., a sleeve) made from a stretchable material (e.g., urethane, rubber, stretchable cloth, or others). The body 1702 may be positionable around an eyewear temple, e.g., by insertion of the eyewear temple through the passage 1714 defined by the stretchable material of the body 1702. The passage 1714 may be circular, ovular, or differently shaped.

The magnetic feature 1704 may include a magnet or be attractable to a magnet. For example, the magnetic feature 1704 may be a strip 1706 of magnetic material (e.g., ferromagnetic material). In yet further examples, the magnetic feature 1704 may include a strip 1706 of non-ferromagnetic material provided with a layer of magnetic material on an exposed side of the strip 1706. The strip 1706 may be provided between the body 1702 and an adapter plate 1708 which defines a groove 1712. In some examples, the strip 1706 may be attached (e.g., bonded, fastened) to the body 1702. In some examples, the adapter plate 1708 may be attached to the body 1702 (e.g., bonded or fastened) with the strip 1706 sandwiched between the adapter plate 1708 and the body 1702, the adapter plate 1708 thereby attaching the strip 1706 to the body 1702. In some examples, the strip 1706 may be secured (e.g., bonded) to the adapter plate 1708 but not to the body 1702. The adapter plate 1708 and strip 1706 may be removable from the body 1702 such that another adapter plate with a differently sized or shaped groove may be attached to the body 1702 to permit attachment with a different wearable device. In some examples, the device guides on a variety of wearable devices may be standardized such that one universal adapter may enable attached of any such wearable device with virtually any eyewear.

The magnetic feature 1704 may be attached to an exterior side of the body, e.g., centered along the wall 1716. In this manner, when the electronic wearable device is attached to the eyewear temple via the adapter 1700, the electronic wearable device may be substantially aligned with the centerline of the temple. The body 1702 may be rotatable around the longitudinal axis of the temple to enable adjustment of the orientation of the electronic wearable device with respect to the centerline of the temple.

In some examples, the metallic feature may be part of a guide for an electronic wearable device, which may enable the removable attachment as well as slidable engagement between the electronic wearable device and the temple. In such examples, the adapter may fix the orientation of the electronic wearable device with respect to the temple but may not fix the position of the electronic wearable device on the temple. In other examples, the metallic features may be part of an attachment interface configured to substantially fix both the position and orientation of the electronic wearable device with respect to the adapter. In such examples, the attachment interface may have a size and shape substantially corresponding to the size and shape of a device guide. The attachment interface may be configured to receive the device guide and restrain movement of the electronic wearable device in both the longitudinal and lateral directions (plus or minus slight movement in either direction as may be due to manufacturing tolerances). When the attachment interface and device guide are engaged in a cooperating fit the electronic wearable device may be fixed (e.g., non-movable) with respect to the adapter.

Figure 16A:
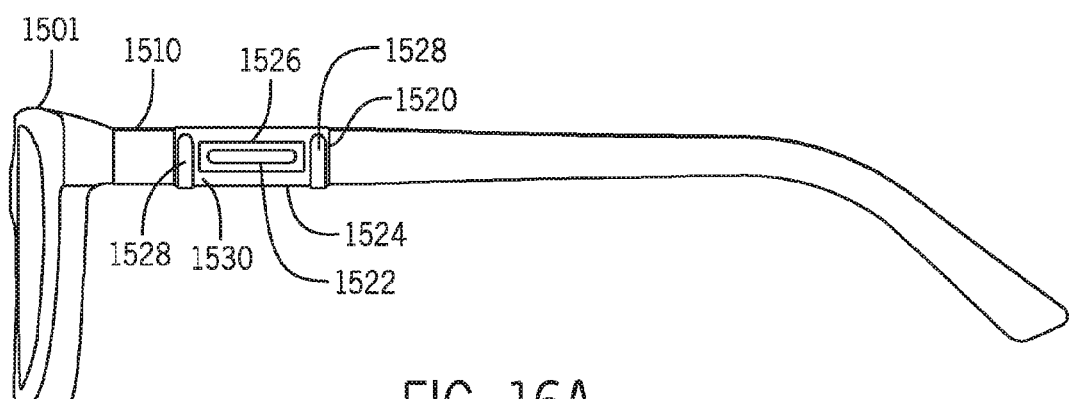
FIGS. 16A-16B show views of an adapter in accordance with another embodiment of the present disclosure.
Figure 16B:
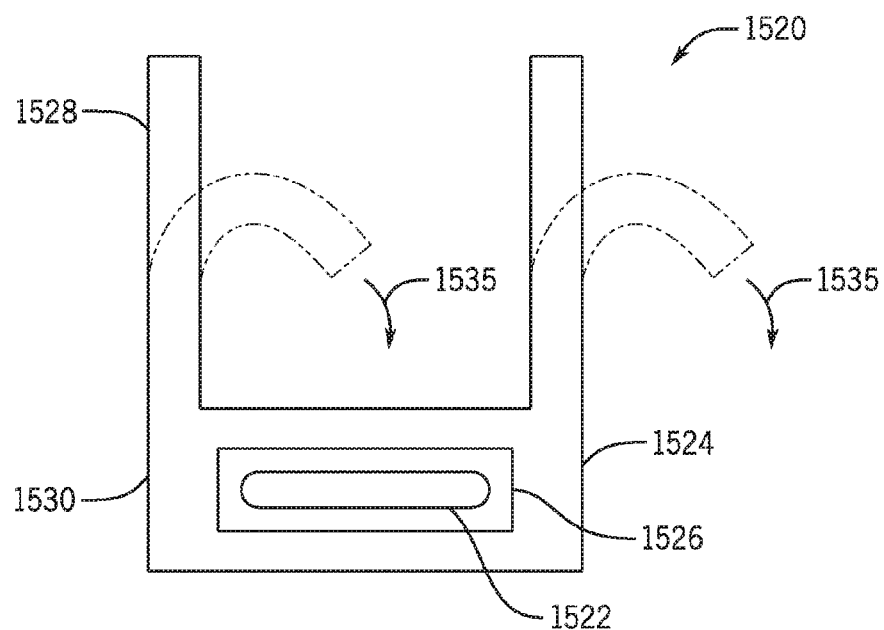

FIG. 16 illustrate another embodiment of an adapter 1520 for attaching a wearable device (e.g., a camera to eyewear e.g., eyewear 1501). The adapter 1520 includes a body 1524 and a magnetic feature 1522 attached to the body 1524. The body 1524 may be configured to removably attach the adapter 1520 to a variety of differently sized eyewear temples. One or more flexible attachment portions 1528 extend from an interface portion 1530 of the body 1524. The flexible attachment portions 1528, the interface portion 1530, or both may be made from a stretchable material (e.g., a stretchable fabric). During use, the flexible attachment portions 1528 may be folded over (e.g., as shown by arrows 1535) to be wrapped around the temple and ends of the flexible attachment portions 1528 may be secured to the interface portion, for example using an adhesive or a fastener, such that the body 1524 encircles the temple 1510 (e.g., the body 1524 surrounds a cross-section of the temple 1510). In some examples, the flexible attachment portions 1528 and interface portion 1530 may be integrally formed, for example from a sheet of stretchable fabric which is able to adhere to itself without a tacky adhesive. For example, the flexible attachment portions 1528 and interface portion 1530 may be formed of self-adherent tape similar to that used in medical applications for bandages or wraps. The use of self-adherent material that does not include tacky adhesives may prevent damage to the temples (e.g., marring aesthetic surfaces of the temple with tacky residue from an adhesive). In other examples, only the end portions of the interface portion 1530 which underlie the flexible attachment portions 1528 when secured thereto may be formed from self-adherent material. In other examples, other combinations of materials and securing means may be used to enable the adapter 1520 to be removably attached to any of a variety of dimple shapes. When attached to the temple, the adapter 1520 or at least a portion thereof may encircle the temple defining a passage similarly to adapter 1700. The adapter 1520 when attached to the temple may be rotatable and/or movable along the temple to adjust a position, alignment or orientation of the wearable electronic device.

The magnetic feature 1522 may be attached to the interface portion 1530 of the body 152.4 for example using conventional techniques (e.g., adhesive, fasteners or via intermediate mechanical components, such as a clip or brackets in some examples, the magnetic feature may be attached using an adapter plate 1526 which may be similar to the adapter plate 1708 of the previous example. The adapter plate 1526 may include a groove configured for cooperating fit with a device guide of an electronic wearable device. In some examples, the adapter and corresponding the groove may be sized to fix the position of the electronic wearable device with respect to the adapter. In other words, the groove may be of a corresponding shape or size to that of the protrusion of a device guide, such that when the protrusion is inserted in the groove the electronic wearable device is substantially prevented from moving in the longitudinal and lateral directions relative to the adapter and is only free to move in a direction perpendicular to the magnetic feature 1522 (e.g., out of the plane of the illustration in FIG. 16A) to enable the attachment and removal of the electronic wearable device to the adapter. In other examples, the groove may be longer to permit sliding engagement similar to a temple guide as described herein.

Although the examples of guides and eyewear systems including such guides have been described herein with an exemplary electronic wearable device in the form of a camera, the electronic wearable device 10 may be virtually any miniaturized electronic device, for example and without limitation a camera, image capture device, IR camera, still camera, video camera, image display system, image sensor, repeater, resonator, sensor, sound amplifier, directional microphone, eyewear supporting an electronic component, spectrometer, microphone, camera system, infrared vision system, night vision aid, night light, illumination system, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, air quality sensor, CO sensor, CO detector, $CO_2$ sensor, $CO_2$ detector, air particulate sensor, air particulate meter, UV sensor, HEV sensor, UV meter, IR sensor IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, acoustic amplification device, acoustic canceling device, hearing aid, assisted hearing assisted device, informational earbuds, smart earbuds, smart ear-wearables, video playback device, video recorder device, image sensor, alertness sensor, information alert monitor, health sensor, health monitor, fitness sensor, fitness monitor, physiology sensor, physiology monitor, mood sensor, mood monitor, stress monitor, motion detector, wireless communication device, gaming device, eyewear comprising an electronic component, augmented reality system, virtual reality system, eye tracking device, pupil sensor, pupil monitor, automated reminder, light, cell phone device, phone, mobile communication device, poor air quality alert device, sleep detector, doziness detector, alcohol detector, refractive error measurement device, wave front measurement device, aberrometer, GPS system, kinetic energy source, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, thermo electric power source, a blue tooth enabled communication device such as blue tooth headset, a hearing aid or an audio system. In some examples, the electronic device may be a smart device.

Although the present disclosure includes, by way of example, illustration and description of some embodiments, it will be understood by those skilled in the art that several modifications to the described embodiments, as well as other embodiments are possible without departing from the spirit and scope of the present invention. It will be appreciated that any of the components, features, or aspects from any of the disclosed embodiments may be used in combination with one another, without limitation, and without departing from the scope of the present disclosure. It will be understood that one or more aspects of any embodiment described herein may be used in combination with aspects of other embodiments. It will also be understood one or more of illustration in the figures herein may not be to scale and certain features may be exaggerated for clarity to illustrate aspects of the present invention.

What is claimed is:

1. An eyewear system comprising:
   a frame including a lens-retaining portion comprising first and second end portions;
   a pair of temples, each connected to a respective one of the first and second end portions; and
   a pair of hinges, each connecting respective one of the temples to a respective one of the first and second end portions:
   wherein, each of the temples comprises a first material and an insert formed of a ferromagnetic material and embedded in the first material, the insert being attached to and extending from the hinge towards a distal end of the temple, and wherein at least one of the temples in the pair comprises a track extending longitudinally along a length of the temple, wherein the track is defined by a groove formed in the first material and extending to a depth of the insert such that a base of the track is defined by the insert and wherein walls of the track are defined, at least in part, by the first material disposed around the insert.

2. The eyewear system of claim 1, wherein the track has a constant width along a depth of the track.

3. The eyewear system of claim 1, wherein the track has a constant width along a full length of the track.

4. The eyewear system of claim 1, wherein a width of the track at a given location along the length of the track is smaller than a width of the ferromagnetic insert at the given location along the length of the track.

5. The eyewear system of claim 1, wherein the width of the track does not exceed 3.0 mm.

6. The eyewear system of claim 1, wherein the width of the track does not exceed 2.5 mm.

7. The eyewear system of claim 1, wherein the depth of the track does not exceed 2.0 mm.

8. The eyewear system of claim 1, wherein the depth of the track does not exceed 1.5 mm.

9. The eyewear system of claim 1, wherein a forward end per QS of the track is located from 5 mm to 20 mm distally of the hinge.

10. The eyewear system of claim 1, wherein the track is at least 15 mm long.

11. The eyewear system of claim 1, wherein each of the temples comprises a track.

12. The eyewear system of claim 1, wherein the first material is plastic.

13. The eyewear system of claim 1, wherein the insert comprises spring steel, stainless steel, or combinations thereof, and wherein the first material comprises acetate.

14. The eyewear system of claim 1, wherein an exposed surface of the insert is coated with a corrosion resistant material.

15. The eyewear system of claim 1, wherein an exposed surface of the insert is coated with a colored material.

16. The eyewear system of claim 1, wherein an exposed surface of the insert is coated with a low-friction material.

17. The eyewear system of claim 1, wherein the track is curved in plan view, and wherein a radius of the track is 90 cm or greater.

18. The eyewear system of claim 1, wherein at least one of the temples of the pair comprises a arm portion and an earpiece portion connected at a bend configured to be positioned over a wearer's ears, and wherein the track spans more than 50% of a length of the arm portion.

19. An eyewear system comprising:
an eyewear frame including a pair of hinges and a pair of temples, each temple of the pair of temples including insert formed of a ferromagnetic material, the insert being attached to and extending from the respective hinge towards a distal end of the respective temple; and
a track provided on at least one of the pair of temples, wherein the track comprises at least one surface defined by the ferromagnetic material of the insert, wherein the track is defined by a longitudinal slot in the at least one temple to a depth extending to the insert such that a base of the track is defined by the insert, and wherein the track is thereby configured to magnetically retain an electronic wearable device in attachment with the at least one temple.

20. The eyewear system of claim 19, wherein the eyewear system further comprises the electronic wearable device, and wherein the electronic wearable device comprises a protrusion including at least one magnet arranged in the protrusion to magnetically attract the ferromagnetic material of the temple when the protrusion is inserted, at least partially, within the track.

21. The eyewear system of claim 19, wherein the track is configured to enable attachment and removal of the electronic wearable device by insertion of a portion of the electronic wearable device into the track along a direction perpendicular to the base of the track.

22. The eyewear system of claim 19, wherein the temple comprises a first material different from the ferromagnetic material, and wherein the first material encloses, at least partially, the ferromagnetic material.

23. The eyewear system of claim 22, wherein the first material is a metal different from the ferromagnetic material.

24. The eyewear system of claim 22, wherein the first material is plastic.

25. The eyewear system of claim 19, further comprising an electronic wearable device including a device guide configured to magnetically attach to the temple, and wherein the electronic wearable device is slidable along the track when the electronic wearable device is attached to the temple.

26. The eyewear system of claim 25, wherein the device guide comprises first and second guide members defining a channel therebetween and a magnet disposed in the channel between the guide members.

27. An eyewear system comprising:
an eyewear frame including first and second hinges and first and second temples, each of the first and second temples including an insert attached to and extending from the respective hinge towards a distal end of the first or second temple;
a temple guide provided on at least one of the first and second temples, wherein the temple guide comprises a track comprising two opposing walls and a floor extending between the two opposing walls, wherein the floor is defined by a surface of the insert; and
an electronic wearable device configured to magnetically attach to the at least one temple via the temple guide, wherein the temple guide is configured to magnetically retain the electronic wearable device in slidable attachment therewith and to restrict lateral movement of the electronic wearable device relative to the temple when the electronic wearable device is engaged with the temple guide, and wherein the electronic wearable device comprises:
a magnet which attaches to the ferromagnetic material; and
an additional member for securing the electronic wearable device to the eyewear.

28. The eyewear system of claim 27, wherein the electronic wearable device is attachable to the at least one temple via magnetic attraction to the floor of the track and wherein the electronic wearable device is oriented by at least one wall of the track when attached to the at least one temple.

29. The eyewear system of claim 27, wherein the temple is made of plastic.

30. The eyewear system of claim 27, wherein the temple is made of metal.

31. The eyewear system of claim 27, wherein the additional member is a securing ring, which encircles a cross section of the temple.

32. The eyewear system of claim 31, wherein the securing ring is translucent or transparent.

33. The eyewear system of claim 32, wherein the securing ring has a cross sectional core thickness of less than 1.5 mm.

34. The eyewear system of claim 27, wherein the magnet is attracted to the ferromagnetic material of the temple by at least 0.5 Newtons when the electronic wearable device is attached to the at least one temple.

35. The eyewear system of claim 27, wherein the magnet is attracted to the ferromagnetic material of the temple by more than 10 Newtons when the electronic wearable device is attached to the at least one temple.

36. The eyewear system of claim 27, wherein the magnet is attracted to the ferromagnetic material of the temple within the range of 1.5 Newtons and 5 Newtons when the electronic wearable device is attached to the at least one temple.

37. The eyewear system of claim 27, wherein the magnet is a bar magnet.

* * * * *